United States Patent
Keir et al.

(10) Patent No.: US 9,895,829 B2
(45) Date of Patent: Feb. 20, 2018

(54) POST-MOLD SYSTEM

(71) Applicant: Husky Injection Molding Systems Ltd., Bolton (CA)

(72) Inventors: William Steven Keir, Aurora (CA); Allan King Leung Lee, Markham (CA); Darrin Albert MacLeod, Jeffersonville, VT (US); Peter Yankov, Bolton (CA); Raymond Weiping Zhang, Brampton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 732 days.

(21) Appl. No.: 14/354,640

(22) PCT Filed: Oct. 17, 2012

(86) PCT No.: PCT/CA2012/050733
§ 371 (c)(1),
(2) Date: Apr. 28, 2014

(87) PCT Pub. No.: WO2013/067633
PCT Pub. Date: May 16, 2013

(65) Prior Publication Data
US 2014/0271963 A1    Sep. 18, 2014

Related U.S. Application Data

(60) Provisional application No. 61/557,620, filed on Nov. 9, 2011.

(51) Int. Cl.
*B29C 35/00* (2006.01)
*B29C 71/02* (2006.01)
(Continued)

(52) U.S. Cl.
CPC .......... *B29C 35/00* (2013.01); *B29C 37/0007* (2013.01); *B29C 45/7207* (2013.01);
(Continued)

(58) Field of Classification Search
CPC ............ B29C 2045/7228; B29C 35/00; B29C 49/6427; B29C 2911/14; B29C 37/0007;
(Continued)

(56) References Cited

U.S. PATENT DOCUMENTS 1,811,276 A * 6/1931 Miller ................ B29D 30/0649
425/151
3,616,495 A * 11/1971 Lemelson ............. B21C 35/023
425/152

(Continued)

FOREIGN PATENT DOCUMENTS

DE   102005057465 A1   5/2007

OTHER PUBLICATIONS

PCT International Search Report; Bowles, Melissa; Dec. 13, 2012, 3 pages.

(Continued)

*Primary Examiner* — Joseph S Del Sole
*Assistant Examiner* — John Robitaille

(57) ABSTRACT

Disclosed herein, amongst other things, is a post-mold system (100, 200, 300, 400, 500) for conditioning a molded article (130). The post-mold system comprises a retrieval device (110, 210, 310, 410, 510) having a receptacle (112, 212, 312, 412, 512) that is configured to retrieve the molded article (130) from a mold (132) and a conditioning device (120, 320, 420, 520). The receptacle (112, 212, 312, 412, 512) is configured to be selectively transferable between the retrieval device (110, 210, 310, 410, 510) and the conditioning device (120, 320, 420, 520). The conditioning device (120, 320, 420, 520) includes a first thermal regulator (140,
(Continued)

240, 440) that is configured to thermally regulate the receptacle (112, 212, 312, 412, 512) when connected thereto.

15 Claims, 25 Drawing Sheets

(51) Int. Cl.
    *B29C 45/72*     (2006.01)
    *B29C 37/00*     (2006.01)
    *B29C 35/16*     (2006.01)
    *B29C 49/64*     (2006.01)
    *B29K 105/00*     (2006.01)

(52) U.S. Cl.
    CPC .......... *B29C 71/02* (2013.01); *B29B 2911/14* (2013.01); *B29C 49/6427* (2013.01); *B29C 2035/1616* (2013.01); *B29C 2045/7214* (2013.01); *B29C 2045/7228* (2013.01); *B29K 2105/258* (2013.01)

(58) Field of Classification Search
    CPC .... B29C 2035/1616; B29C 2045/7214; B29C 45/7207; B29C 71/02; B29K 2105/258; B29B 2911/14
    See application file for complete search history.

(56) References Cited

U.S. PATENT DOCUMENTS

| | | |
|---|---|---|
| RE33,237 E | 6/1990 | Delfer |
| 6,223,541 B1 | 5/2001 | Farrag |
| 6,332,770 B1 | 12/2001 | Oueslati et al. |
| 6,558,598 B2 | 5/2003 | Neter |
| 6,770,239 B2 | 8/2004 | Oueslati |
| 7,780,884 B2 | 8/2010 | Niewels |
| 2008/0089972 A1 | 4/2008 | Ansari |
| 2009/0212459 A1 | 8/2009 | Neter |
| 2009/0297684 A1 | 12/2009 | Sicilia |
| 2010/0276848 A1 | 11/2010 | Chen |

OTHER PUBLICATIONS

European Search Report, Gerald Gemeinbeck, Sep. 22, 2015, 6 pages.

* cited by examiner

POST-MOLD SYSTEM

TECHNICAL FIELD

Non-Limiting embodiments disclosed herein generally relate to a post-mold system and a related method of post-mold conditioning of a molded article in the post-mold system.

BACKGROUND OF THE INVENTION

It is known in the art of molding to provide a post-mold system as an extension of an overall molding system for providing conditioning (i.e. heating or more commonly cooling) of a molded article after it has been removed from a mold within which it was produced.

A typical post-mold-system includes a retrieval device for retrieving the molded article from the mold and for conditioning it thereafter. The conditioning provided to the molded article in the retrieval device is usually to cool it outside of the mold until it reaches a form stable temperature. A technical effect of the foregoing is to reduce the amount of in-mold cooling time and thereby reduce the overall time required to perform a complete molding cycle. A typical retrieval device includes a receptacle for the molded article that is defined in a tubular body. The tubular body is also configured to define a circulation channel for the circulation of cooled water, whereby the molded article may be cooled within the receptacle by means of conduction cooling. To accommodate movement of the receptacle in retrieving the molded article from the open mold, the receptacle is fixed to a carrier that is mounted to a movement structure such as a programmable robot. The carrier also provides a means for connecting the circulation channel to a source and sink of coolant.

An example of the foregoing retrieval device may be referenced in commonly assigned U.S. patent RE33,237 to Delfer, published on Jun. 19, 1990. In particular, the patent discloses a carrier plate cooperating with an injection molding machine and having at least two sets of cavities therein for cooling the hollow plastic articles, with the number of cavities corresponding to a multiple of at least two times the number of hollow plastic articles produced in an injection molding cycle. The apparatus also includes means for aligning one set at a time of said carrier plate cavities to juxtapose said set of cavities with the hollow plastic articles formed in an injection molding cycle, and means for transferring said hollow plastic articles to said juxtaposed cavities The typical post-mold system may also include additional conditioning devices to further accelerate the cooling of the molded article and/or to deal with specific conditioning requirements thereof (e.g. focused cooling of relatively warm regions of the molded article).

An example of such a post-mold system may be referenced in commonly assigned U.S. Pat. No. 6,558,598 to Neter, published on May 6, 2003, which discloses an improved method and apparatus for injection molding and cooling molded articles such as preforms so as to avoid crystallinity. The apparatus and method make use of a take-off plate (i.e. retrieval device) for removing articles from a mold, which plate may include heat transfer devices for cooling exterior surfaces of the molded articles or preforms, and a system (i.e. additional conditioning device) for cooling in a controlled manner interior surfaces of the molded articles or preforms. The additional conditioning device is provided as cooling pins for expelling coolant, such as air, on relatively high-heat regions of the molded article.

Another example of such a post-mold system is provided in commonly assigned U.S. Pat. No. 6,770,239 to Oueslati, published on Aug. 3, 2004. The difference to the foregoing is that the cooling pin is inserted into the preform such that it makes contact with targeted area, such as the mold gate area, for providing conductive cooling thereto.

Of a rather different design than the foregoing is a post-mold system as described in US patent application publication 2009/0297648 to Sicilia, published on Dec. 3, 2009. The post-mold system includes an end of arm tool (i.e. retrieval device) that transfers the molded preforms from the mold to a temperature conditioning station (i.e. additional conditioning stations) having a conveyor. The batch of molded preforms is received and retained on the end of arm tool by an array of cooling tubes that are attached to a number of identical cooling tubes carrier devices. The conveyor is adapted to receive the carrier devices and the cooling tubes loaded with molded preforms from the end of arm tool. The conveyor is also adapted to transfer rapidly the carrier devices and the empty cooling tubes into the end of arm tool before the end of arm tool is moved back into the molding area to receive subsequent batches of molded preforms.

Also of note is US patent application publication 2009/0212459 to Neter, published on Aug. 27, 2009 which discloses a system for the post-treatment of preforms produced in an injection molding mold, comprising at least two post-treatment tools which each have a receiving plate which has a group of receiving cavities and a pin plate which has a group of post-treatment pins, and a device for transferring the preforms from the injection molding mold alternately into the at least two post-treatment tools. In order to provide a method of and a system for the post-treatment of preforms produced in an injection molding mold, which on the one hand allows early removal of the preform from the injection molding tool and which on the other hand allows reliable post-treatment in particular of the interior of the preform after removal from the injection molding mold, it is proposed in accordance with the invention that the post-treatment pins remain in the preforms for a period of time which is longer than the mold stand time

SUMMARY OF THE INVENTION

A general aspect of the present invention is to provide a post-mold system for conditioning a molded article. The post-mold system comprises a retrieval device having a receptacle that is configured to retrieve the molded article from a mold and a conditioning device. The receptacle is configured to be selectively transferable between the retrieval device and the conditioning device. The conditioning device includes a first thermal regulator that is configured to thermally regulate the receptacle when connected thereto.

Another general aspect of the present invention is to provide a controller including instructions being embodied in a controller-usable memory of the controller, the instructions for directing the controller to execute a method of post-mold conditioning of a molded article in a post-mold system. The method includes retrieving the molded article from a mold with a receptacle of a retrieval device, transferring the receptacle along with the molded article from the retrieval device to a conditioning device, and thermally regulating the receptacle with a first thermal regulator that is associated with the conditioning device to cause a conditioning of an exterior portion of the molded article.

These and other aspects and features of non-limiting embodiments will now become apparent to those skilled in the art upon review of the following description of specific non-limiting embodiments of the invention in conjunction with the accompanying drawings.

DETAILED DESCRIPTION OF THE DRAWINGS

The non-limiting embodiments will be more fully appreciated by reference to the accompanying drawings, in which:

The odd numbered FIGS. 1-21 depict an operating sequence of a molding system having a post-mold system in accordance with a first non-limiting embodiment of the present invention as seen from above.

The even numbered FIGS. 2-22 depict the operating sequence of the molding system and of the post-mold system therein as seen from the side.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE EMBODIMENT(S)

Reference will now be made in detail to various non-limiting embodiment(s) of a post-mold system and a related method of conditioning (i.e. heating and/or cooling) a molded article therein. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
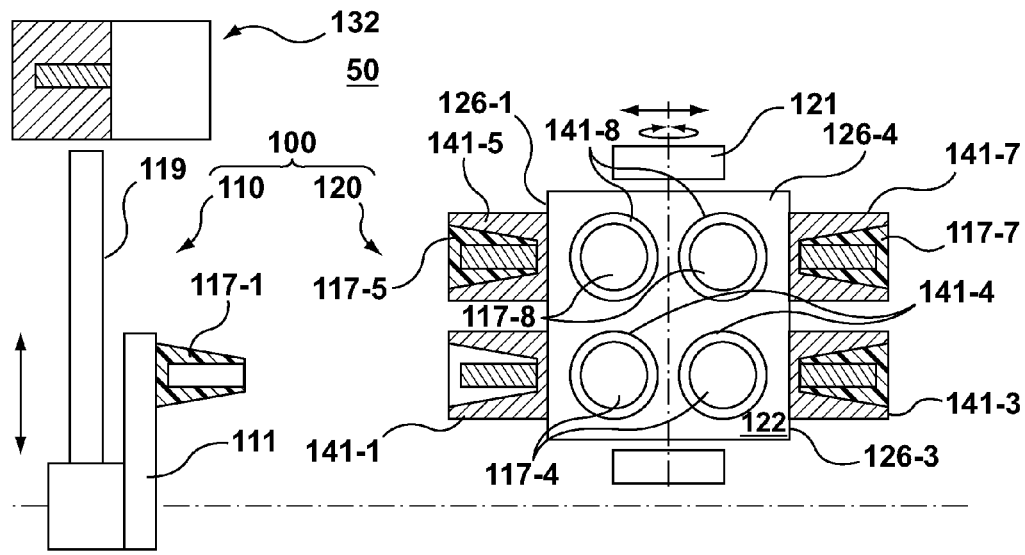
Figure 2:
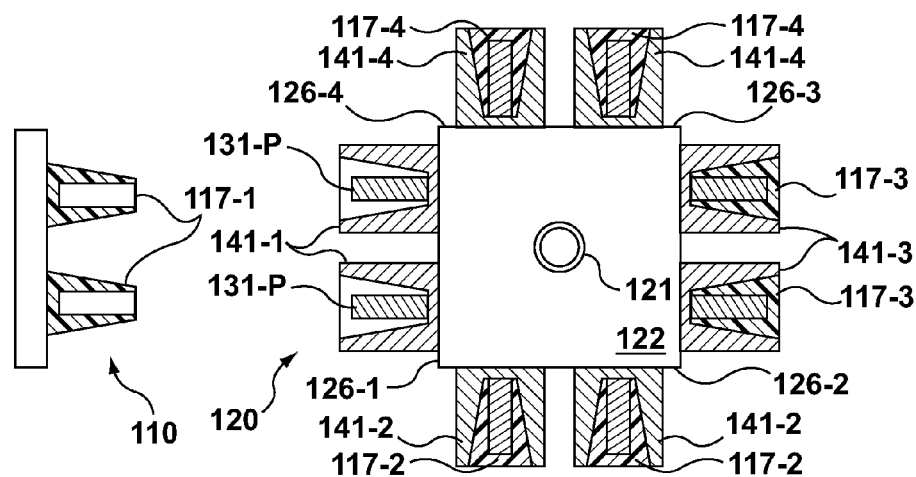

With reference to FIGS. 1 and 2, there is depicted a molding system 50 that includes a mold 132 for molding of a molded article (not shown) and a post-mold system 100 for conditioning of the molded article.

The structure and method of operating the mold 132 is in accordance with known structures and steps and as such will not be described herein.

Broadly speaking, the post-mold system 100 includes a retrieval device 110 and a conditioning device 120. Process of conditioning of the molded articles begins in the retrieval device 110 and continues in the conditioning device 120 as pointed out below.

The retrieval device 110 includes a movement structure 119, such as a programmable robot, for moving a first carrier 111, along the directional arrows shown, between an inboard position (i.e. between halves of the mold 132) and an outboard position (i.e. outside of a mold envelope) relative to the mold 132. The retrieval device 110 also includes eight sets of receptacles for accommodating groups of molded articles therein. The eight sets of receptacles are configured to be selectively transferable between the retrieval device 110 and the conditioning device 120 along with the group of molded articles therein. That is, the sets of receptacles may be selectively coupled to either the retrieval device 110 or to the conditioning device 120. Several non-limiting means by which the sets of receptacles may be selectively coupled to the retrieval device 110 or to the conditioning device 120 will be discussed later. The retrieval device 110 is configured to accommodate only one set of receptacles at a time, the remainder being associated with the conditioning device 120. That being said, those of skill in the art will appreciate that the quantity of sets of receptacles and their distribution between the retrieval device and the conditioning device is a matter of design choice and no such specific limitation on the generality thereof is intended.

The conditioning device 120 includes another movement structure 121 for moving a second carrier 122, along the directional arrows shown, between a clearance position and a coupling position relative to the retrieval device 110. The movement structure 121 is also configured to rotate the second carrier 122 to selectively present one of four working faces thereon towards the retrieval device 110. The conditioning device 120 also includes multiple sets of thermal regulators that are configured to thermally regulate (i.e. actively heat or cool) the sets of receptacles when connected thereto. Several non-limiting embodiments of the thermal regulators will be discussed later. More specifically, a first face 126-1 of the second carrier 122 is configured to include a first set of thermal regulators 141-1 and a fifth set of thermal regulators for thermally regulating a first set of the receptacles 117-1 and a fifth set of receptacle 117-5, respectively, when connected thereto. Likewise, a second face 126-2 of the second carrier 122 is configured to include a second set of thermal regulators 141-2 and a sixth set of thermal regulators (not shown) for thermally regulating a second set of the receptacles 117-2 and a sixth set of receptacles, respectively, when connected thereto. Similarly, a third face 126-3 of the second carrier 122 is configured to include a third set of thermal regulators 141-3 and a seventh set of thermal regulators 141-7 for thermally regulating a third set of the receptacles 117-3 and a seventh set of receptacles 117-7, respectively, when connected thereto. Lastly, a fourth face 126-4 of the second carrier 122 is configured to include a fourth set of thermal regulators 141-4 and an eighth set of thermal regulators 141-8 for thermally regulating a fourth set of the receptacles 117-4 and an eighth set of receptacles 117-8, respectively, when connected thereto.

The operation of the post-mold-system 100 will now be briefly discussed. In FIGS. 1 and 2, it may be appreciated, amongst other things, that: i) the mold 132 is closed; ii) the first carrier 111 of the retrieval device 110 is arranged in the outboard position with the first set of receptacles coupled thereto; iii) the conditioning device 120 is in its clearance position with the first face 126-1 facing the retrieval device 110; and iv) a previously molded group of molded articles 131-*p* are captured on the first face 126-1 of the second carrier 122 having already been previously conditioned within the first set of receptacles 117-1.

Figure 3:
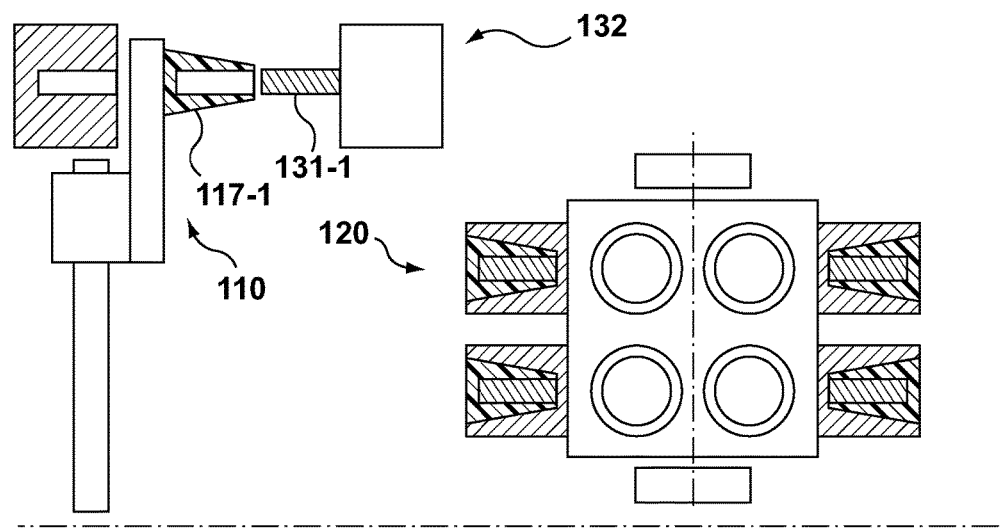
Figure 4:
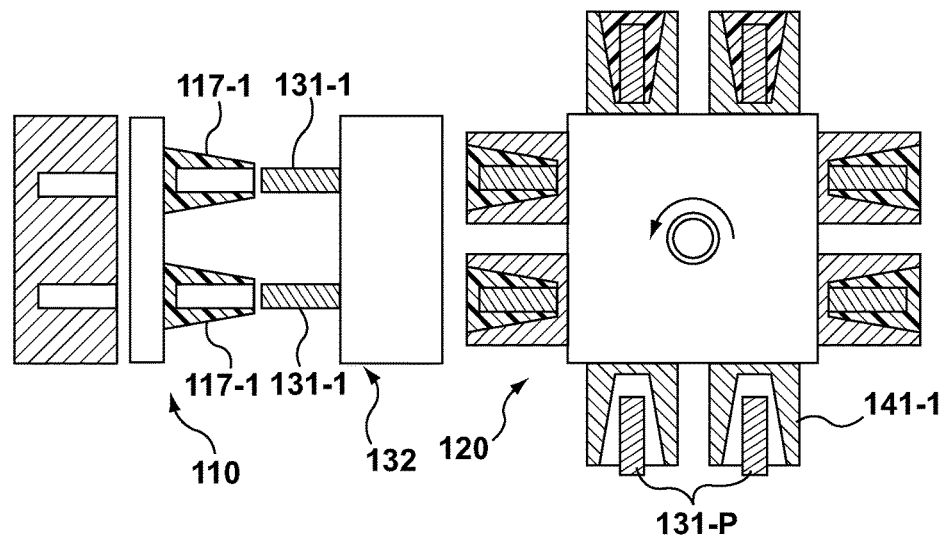

In the next step, as may be appreciated with reference to FIGS. 3 and 4: i) the mold 132 has opened; ii) the first carrier 111 of the retrieval device 110 has moved to the inboard position for retrieving a first group of molded articles 131-1 from the mold 132; and iii) the conditioning device 120 remains in its clearance position and has rotated to orient (i.e. downwards) the previously molded group of molded articles 131-*p* for ejection therefrom.

Figure 5:
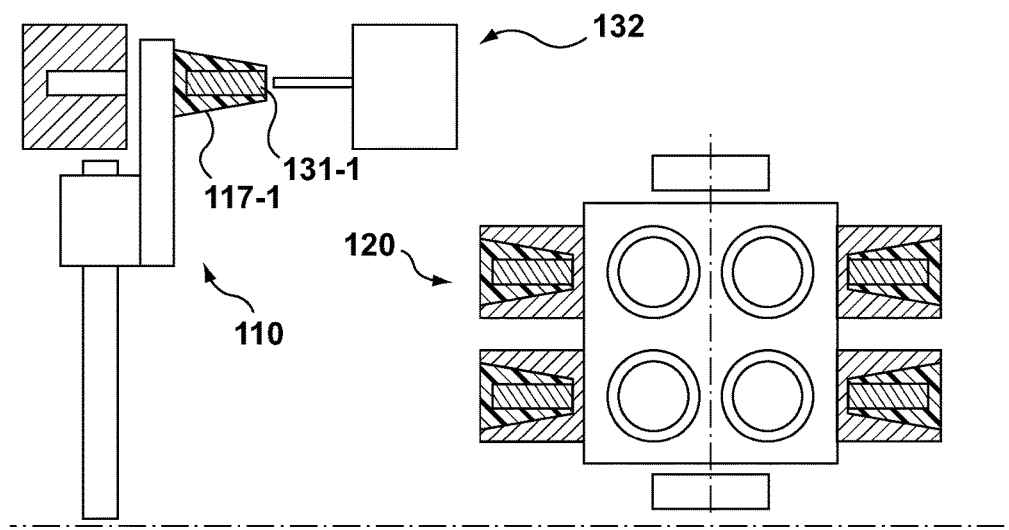
Figure 6:
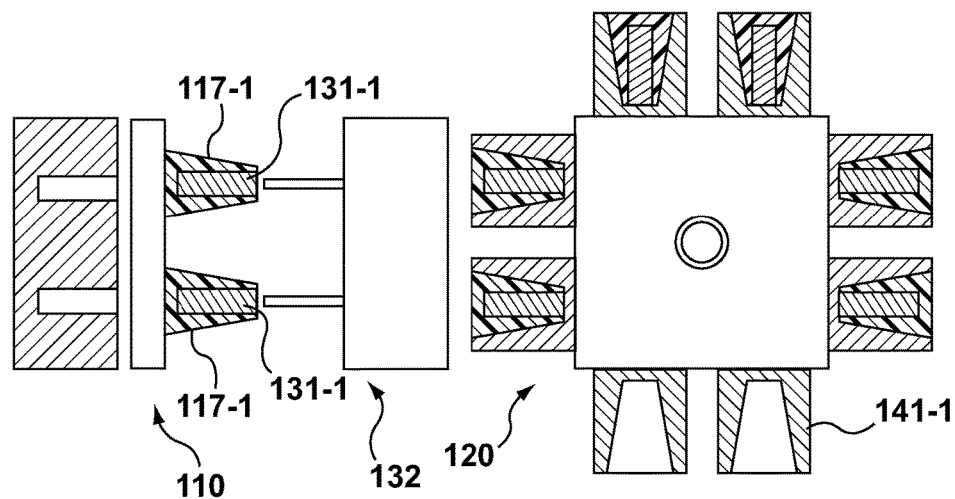

In the next step, as may be appreciated with reference to FIGS. 5 and 6: i) the first group of molded articles 131-1 have been ejected from the mold 132 and have been received within the first set of receptacles 117-1; and ii) the previously molded group of molded articles 131-*p* have been ejected from the conditioning device 120.

Figure 7:
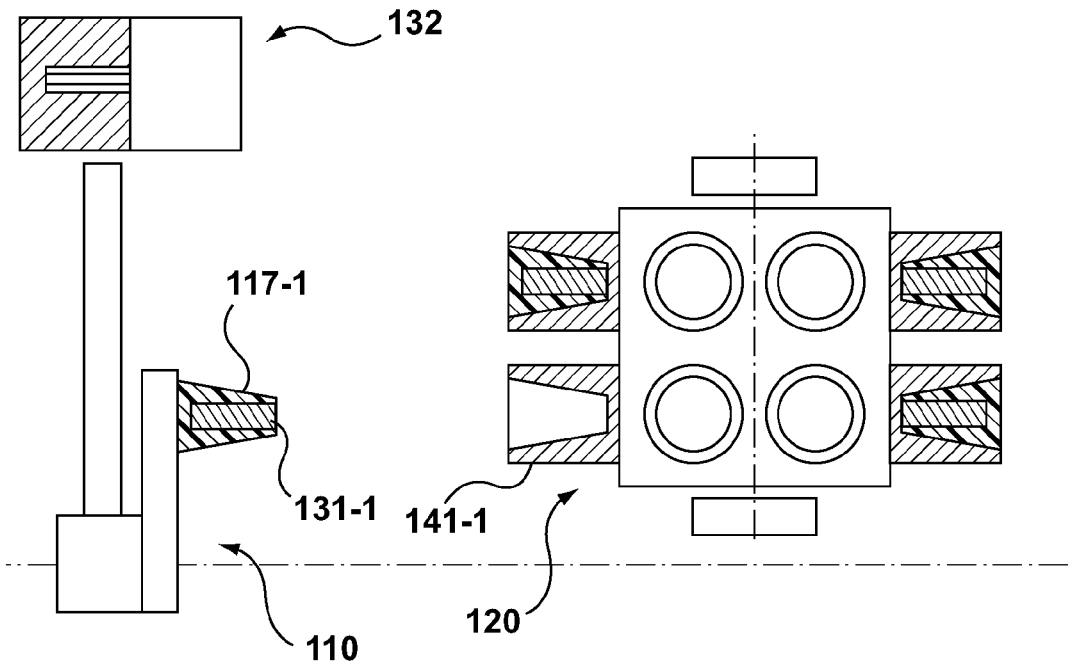
Figure 8:
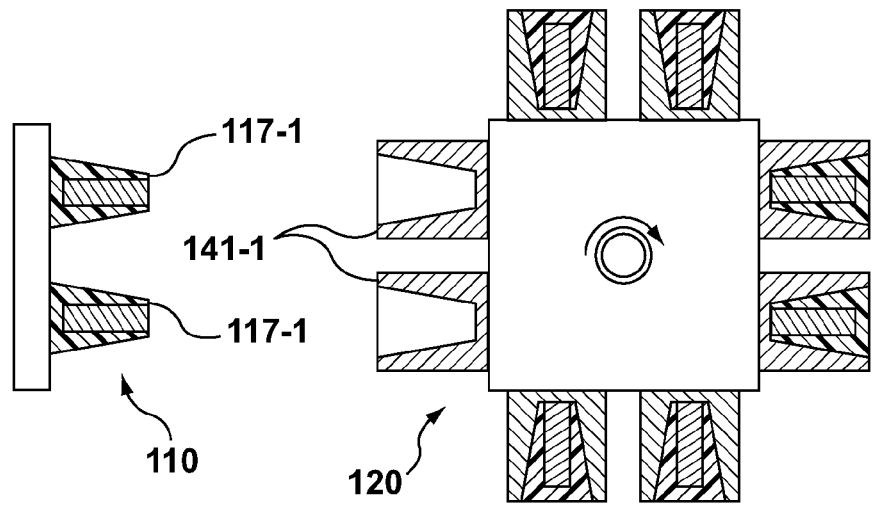

In the next step, as may be appreciated with reference to FIGS. 7 and 8: i) the mold 132 has closed; ii) the first carrier 111 of the retrieval device 110 has moved to the outboard position with the first set of receptacles 117-1 holding the first group of molded articles 131-1 therein; and iii) the conditioning device 120 has rotated to orient the first face 126-1 towards the retrieval device 110 such that the first set of receptacles 117-1 on the retrieval device 110 are aligned with the first set of thermal regulators 141-1 on the conditioning device 120.

Figure 9:
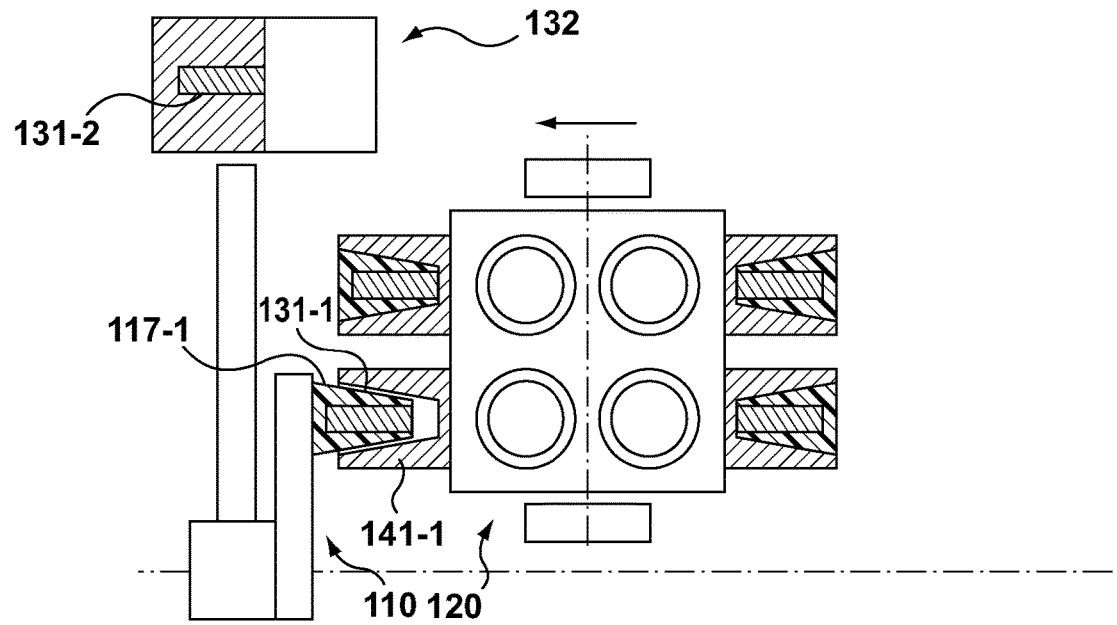
Figure 10:
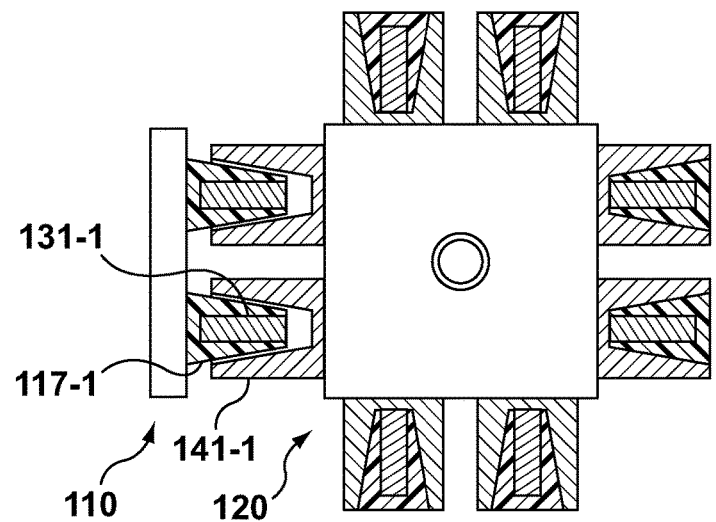

In the next step, as may be appreciated with reference to FIGS. 9 and 10: i) a second group of molded articles 131-2 are being molded in the mold 132; and ii) the conditioning device 120 has moved to its coupling position such that the conditioning device 120 is positioned adjacent to the first set of receptacles 117-1, whereby the first set of receptacles 117-1 are arranged within the first set of thermal regulators 141-1.

Figure 11:
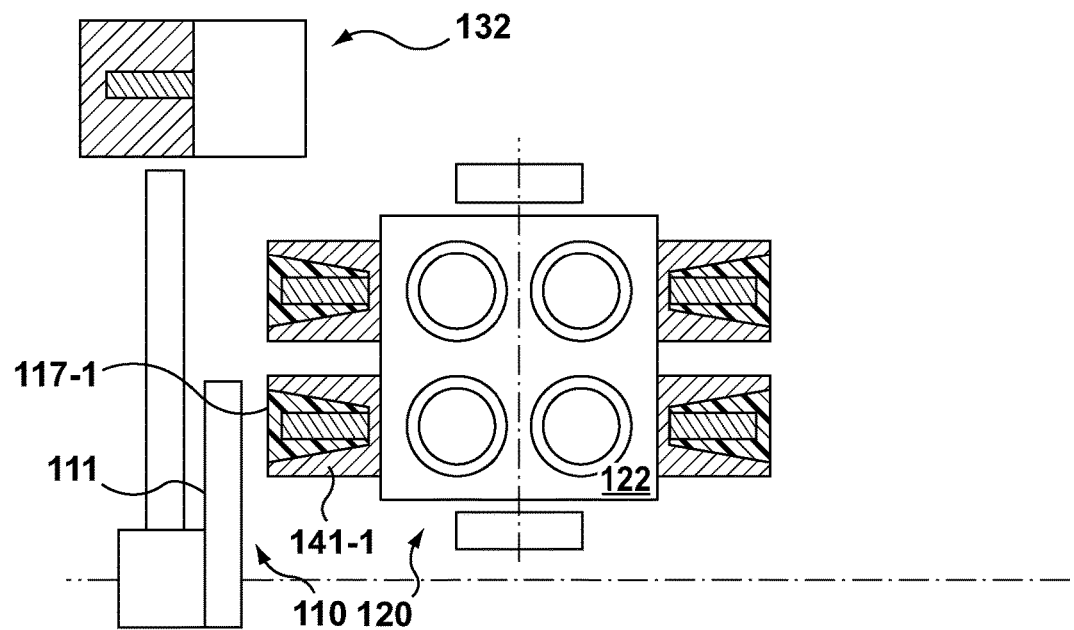
Figure 12:
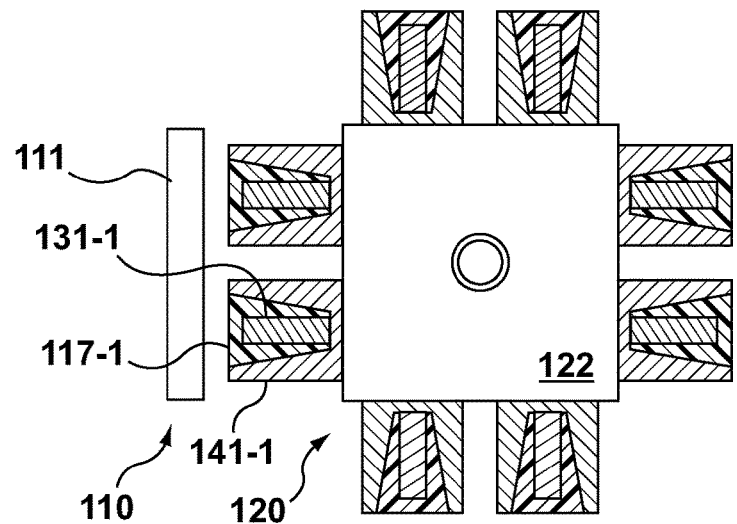

In the next step, as may be appreciated with reference to FIGS. 11 and 12, the first receptacles 117-1 have been transferred from the retrieval device 110 to the conditioning device 120 and in so doing the first set of receptacles 117-1 have been connected to the first set of thermal regulators 141-1.

Figure 13:
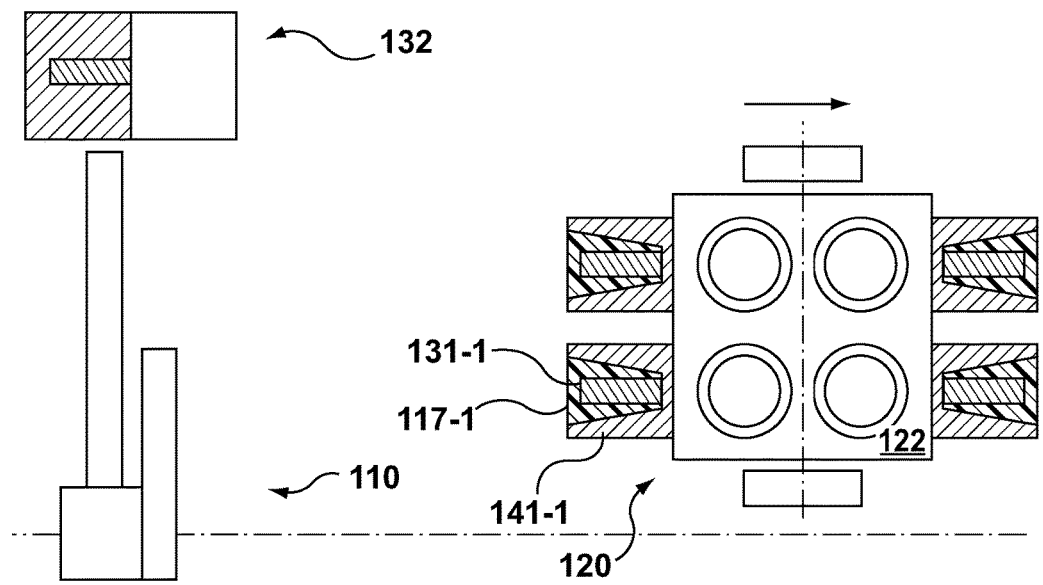
Figure 14:
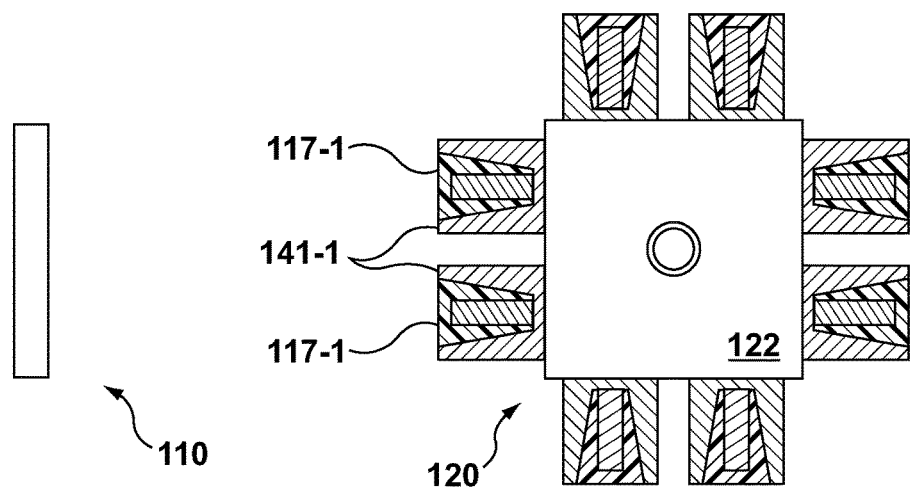

In the next step, as may be appreciated with reference to FIGS. 13 and 14, the conditioning device 120 has moved back to its clearance position.

Figure 15:
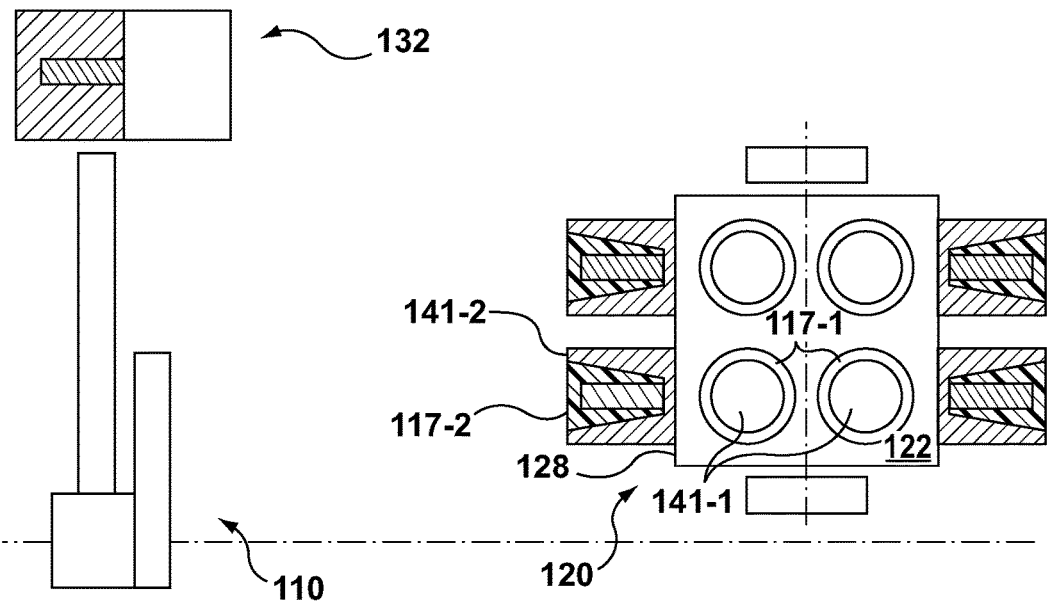
Figure 16:
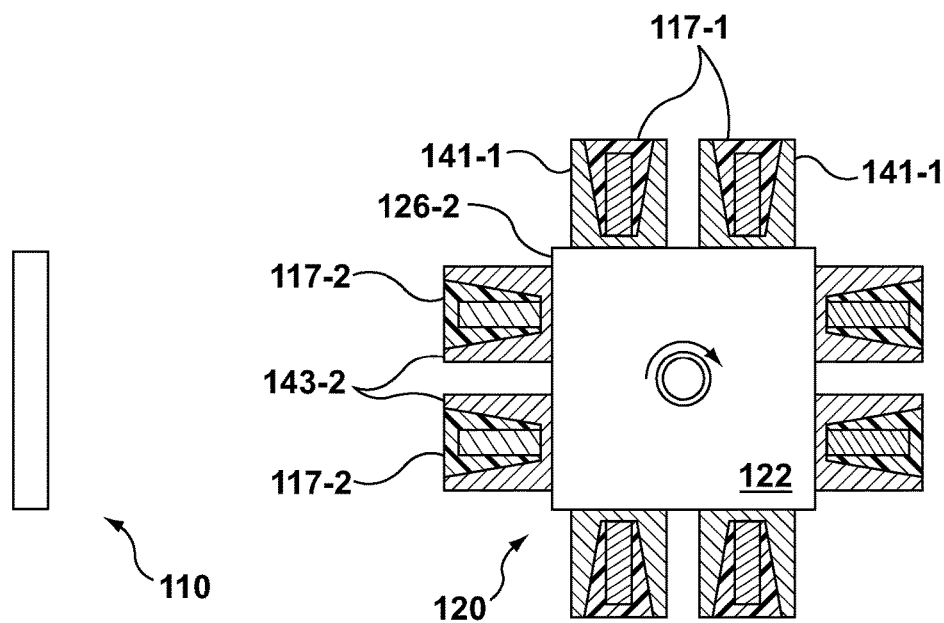

In the next step, as may be appreciated with reference to FIGS. 15 and 16, the conditioning device 120 has rotated to orient the second face 126-2 towards the retrieval device 110.

Figure 17:
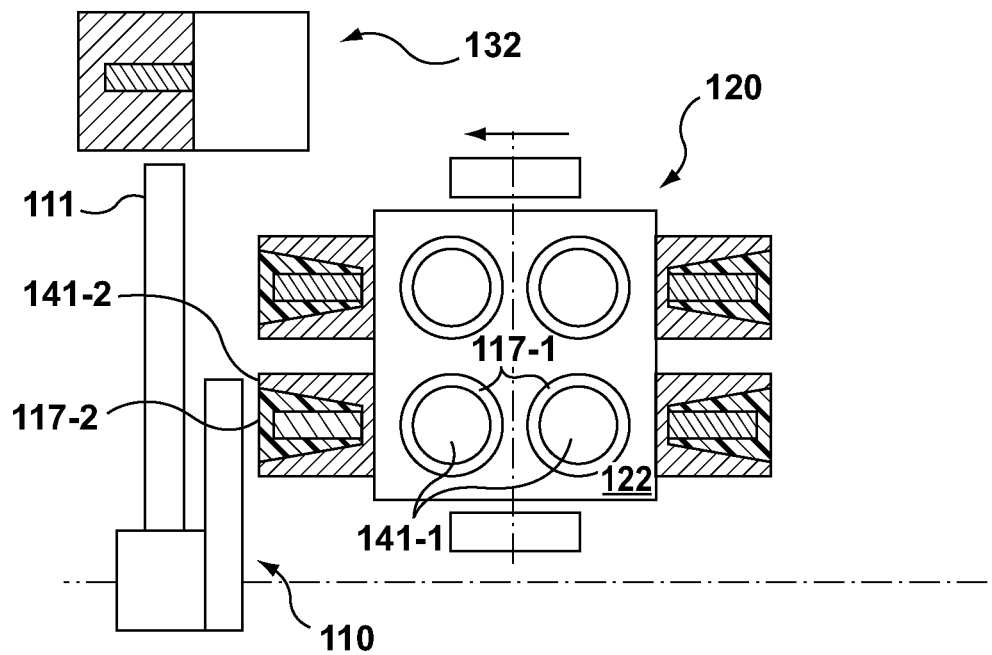
Figure 18:
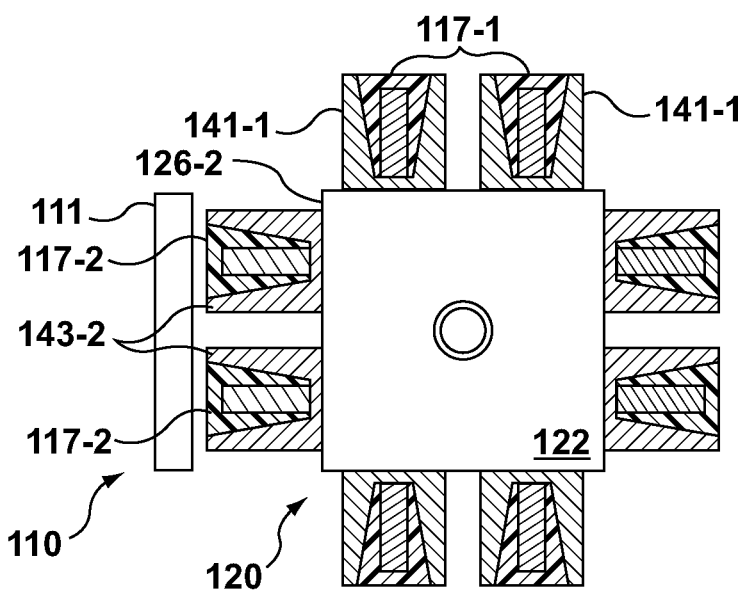

In the next step, as may be appreciated with reference to FIGS. 17 and 18, the conditioning device 120 has moved back to its coupling position such that the second set of receptacles 117-2 that are coupled to the second face 126-2 of the conditioning device 120 are positioned adjacent to the first carrier 111.

Figure 19:
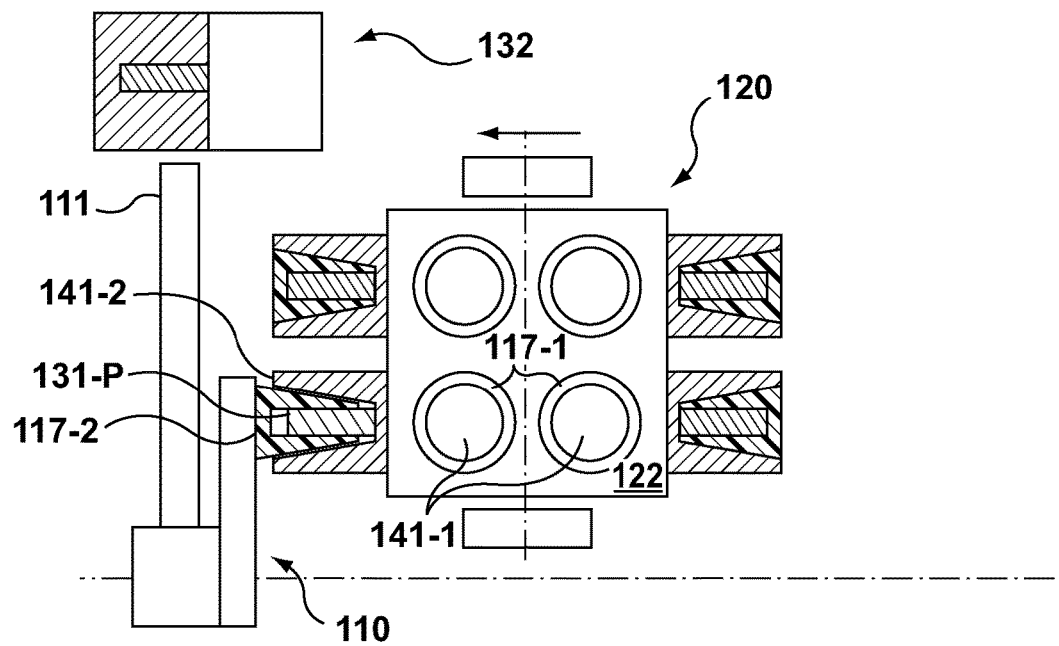
Figure 20:
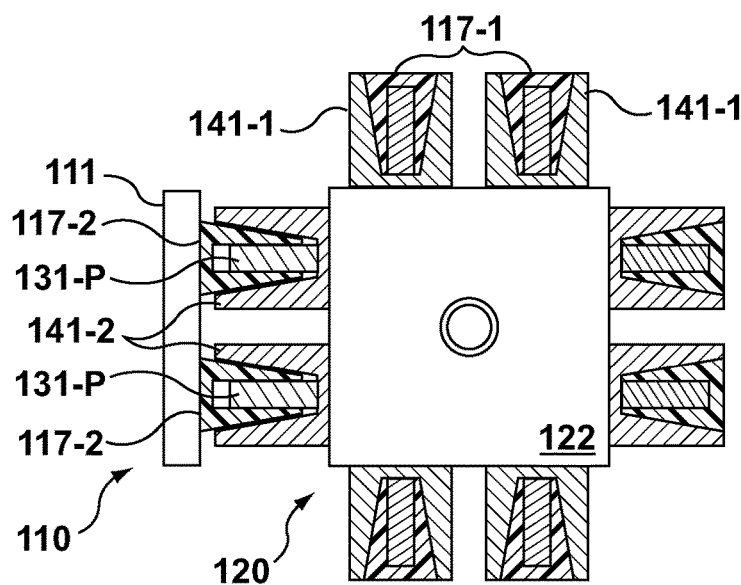

In the next step, as may be appreciated with reference to FIGS. 19 and 20, the second set of receptacles 117-1 have been transferred from the conditioning device 120 to the retrieval device 110 and that another previously molded group of molded articles 131-*p* that were previously conditioned within the second set of receptacles 117-2 have been transferred from the second set of receptacles 117-2 to the conditioning device 120.

Figure 21:
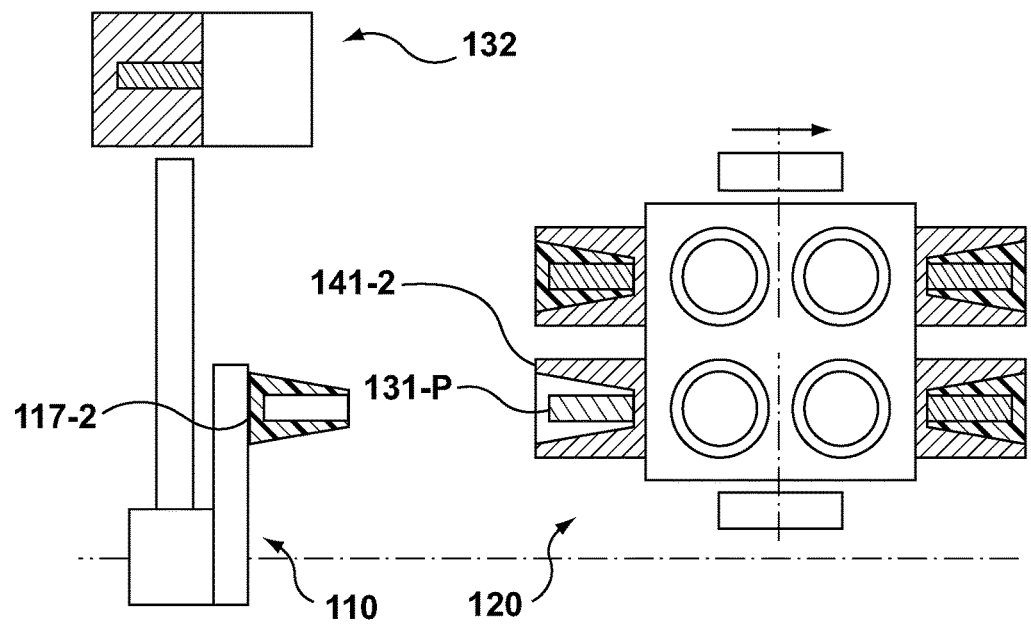
Figure 22:
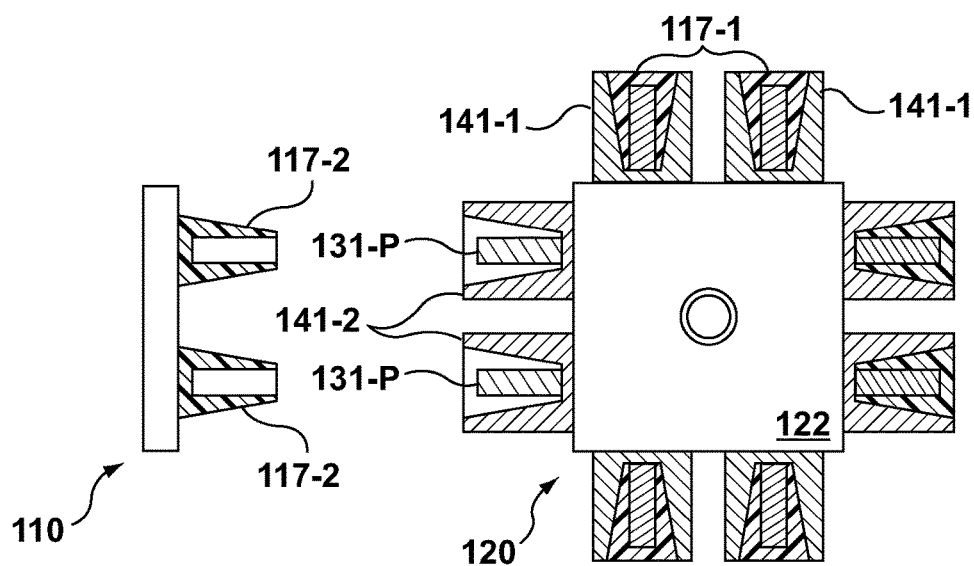

Lastly, as may be appreciated with reference to FIGS. 21 and 22, the conditioning device 120 has moved back to its clearance position. With this last step it may be appreciated that the post-mold-system 100 is now back in a similar configuration to that from which it began with reference to FIGS. 1 and 2.

At this point the method may then repeats for each of the eight sets of receptacles, starting with the second set of receptacles 117-2 that are now coupled to the retrieval device 110.

Figure 23:
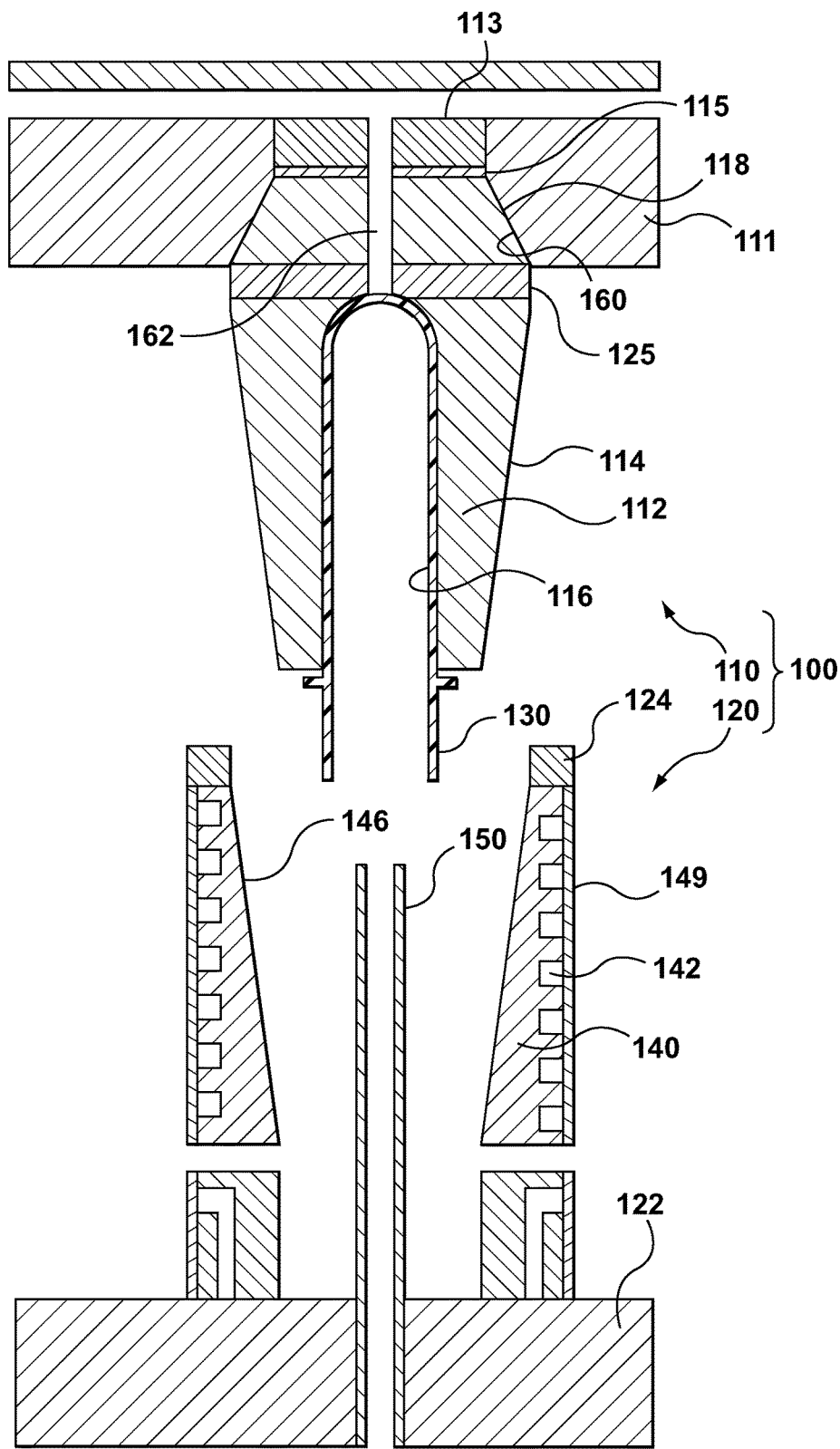
FIGS. 23-27 depict an alternate operating sequence of the post-mold system of FIG. 1.

Reference shall now be made to FIG. 23 that depicts various structural details of the post-mold system 100. In particular, the structure of a receptacle 112 and a first thermal regulator 140 of one of the sets of receptacles and thermal regulators, respectively, may be appreciated.

The basic structure of the receptacle 112 is one of a tubular body. The tubular body defines a cavity 116 within which to receive a molded article 130. The cavity 116 is configured to provide an intimate fit with the interior of the molded article 130. A slight interference fit may be provided between the cavity 116 and the molded article 130 to ensure that the molded article 130 remains in contact therewith as it shrinks with cooling. As such, it may be said that the receptacle 112 is configured to provide conductive conditioning to the molded article 130. Conductive conditioning may be followed by convective conditioning in late stages by blowing delivering fluid (e.g. air by means of pressure channel 162) to the gap formed between the molded article and the cavity either due to the molding article shrinking or through the molded article being displaced by means of fluid flow or a mechanical device such as discussed in commonly assigned U.S. Pat. No. 7,780,884 to Niewels, published on Aug. 24, 2010. The tubular body also defines a pressure channel 162 in the base thereof which to connect the cavity 116 to a sink or source of air for holding or ejecting of the molded article in the cavity 116. Furthermore, the tubular body has a pair of conical tapers around the ends thereof. The first taper defines a first mating interface 114 that is configured to be received in a first seat 146 that is defined in the first thermal regulator 140. The second taper defines a second mating interface 118 that is configured to be received in a second seat 160 that is defined in the first carrier 111.

The basic structure of the first thermal regulator 140 is one of a tubular body. The tubular body defines the first seat 146 within which to receive the first mating interface 114 on the receptacle 112. The first seat 146 and the first mating interface 114 of the receptacle 112 have complementary tapers for sake of ensuring a good thermal link therebetween. The tubular body also defines a circulation channel 142 within which to circulate a conditioning fluid (e.g. cooled water). The circulation channel is defined in a groove formed in the outer surface of the tubular body and that is bounded by a sleeve 149 that surrounds the tubular body.

The first carrier 111 of the retrieval device 110 has a set of first couplers with which to selectively couple a selected set of receptacles thereto. A first coupler 113 of the set of first couplers is shown with which to selectively couple the receptacle 112 of the selected set to the first carrier 111. The first coupler 113 is an electro-magnet, and wherein the receptacle 112 includes a first ferromagnetic interface 115 that is configured to selectively couple therewith. Alternatively, the receptacles may be grouped together on a common rail (not shown) that is selectively couplable to the first carrier 111.

The second carrier 122 of the conditioning device 120 has sets of second couplers with which to selectively couple the sets of receptacles thereto. A second coupler 124 of one of the sets of second couplers is shown that is configured to selectively couple the receptacle 112 thereto. The second coupler 124 may also be an electro-magnet that is disposed at a free end of the tubular body of the first thermal regulator 140, and wherein the receptacle 112 includes a second ferromagnetic interface 125 that is configured to selectively couple therewith. Alternatively, the second coupler may be located at the mounted end of the tubular body 140, between the two ends in the wall of 140 or in the carrier 122.

In addition, it may also be appreciated that the conditioning device 120 may further include sets of pins that are configured to condition interior portions of the groups of molded articles that are being held in the conditioning device 120. The sets of pins are arranged on the conditioning device 120 to coincide with the multiple sets of thermal regulators. A pin 150 of one of the sets of pins is shown that is centered within the first thermal regulator 140, the pin 150 being arranged to condition the interior of the molded article 130 when the receptacle 112 is received within the first thermal regulator 140. The pin 150 may be a tube that is configured to be connected to a source or sink of air (not shown) for establishing a circulation of air within the interior of the molded article 130.

The operation of the foregoing technical features of the post-mold system 100 will now be briefly discussed. In FIG. 23, it may be appreciated, amongst other things, that: i) a molded article (depicted as a preform of the type for blow molding into container) is being held in the receptacle 112; and ii) that the conditioning device 120 is in its clearance position relative to the retrieval device 110 (i.e. spaced therefrom).

Figure 24:
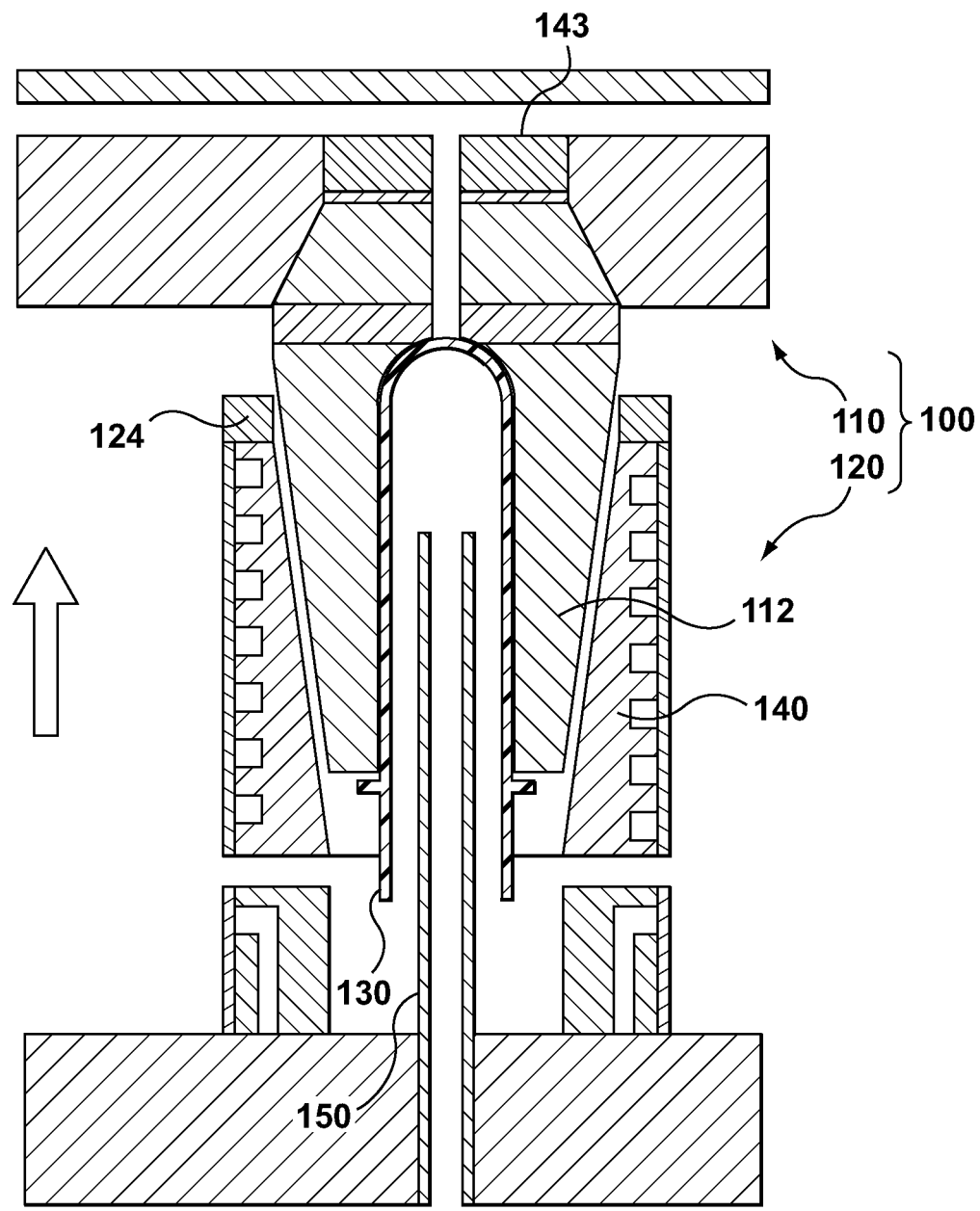

In the next step, as may be appreciated with reference to FIG. 24, the conditioning device 120 is moved to its coupling position relative to the retrieval device 110 (i.e. adjacent thereto) and in so doing position the pin 150 within the molded article 130.

Figure 25:
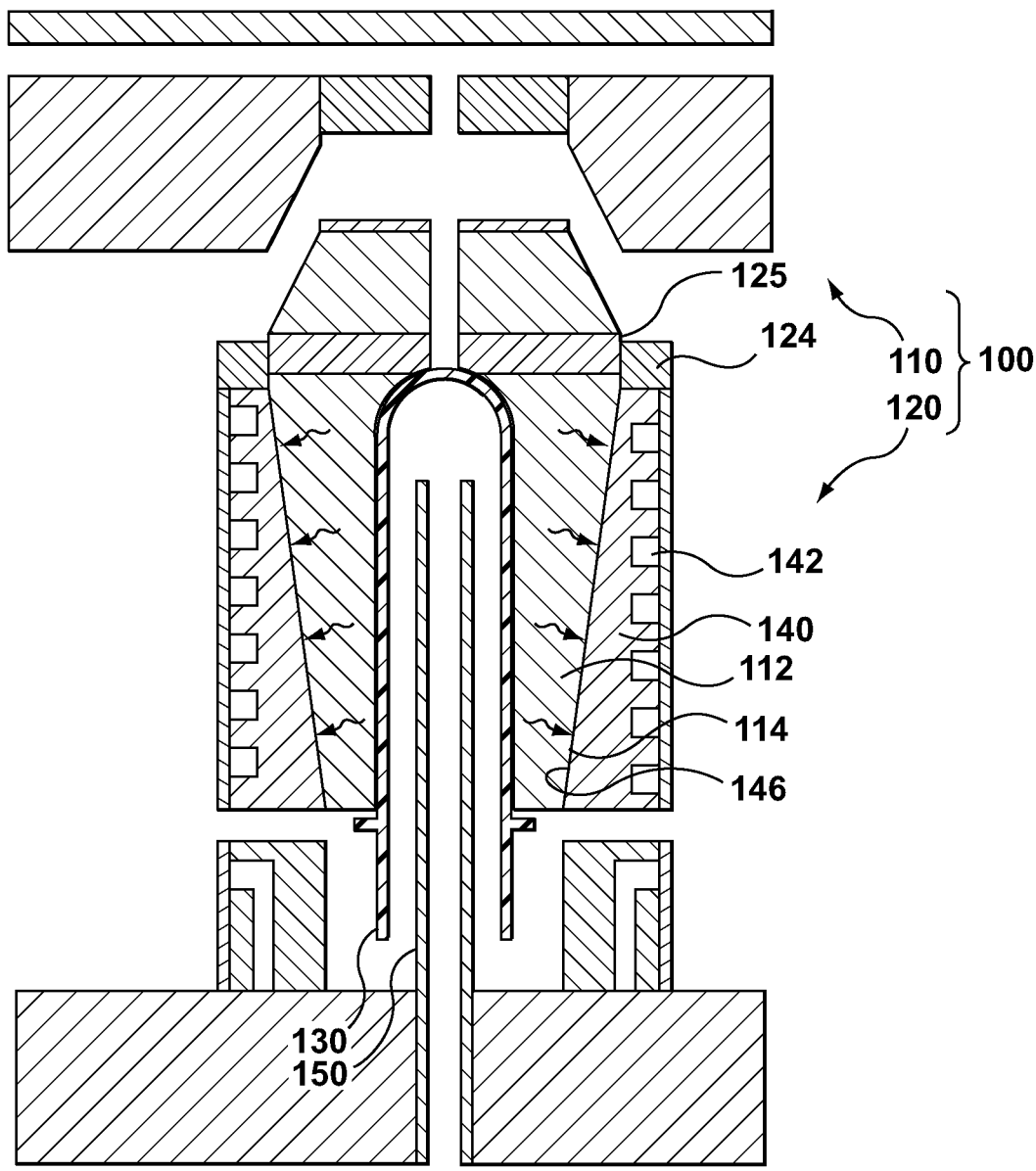

In the next step, as may be appreciated with reference to FIG. 25, the receptacle 112, along with the molded article 130 therein, is transferred from the retrieval device 110 to the conditioning device 120. This step requires decoupling the receptacle 112 from the retrieval device 110 with operation of the first coupler 113 (i.e. de-energizing the electromagnet associated therewith) and coupling of the receptacle 112 to the conditioning device 120 with the operation of the second coupler 124 (i.e. energizing the electromagnet associated therewith). In so doing, the first mating interface 114 on the receptacle 112 is received within the first seat 146 of the first thermal regulator 140, whereby the two become thermally linked for conditioning (e.g. cooling) of the receptacle 112 and ultimately the molded article 130 that is being held therein.

Figure 26:
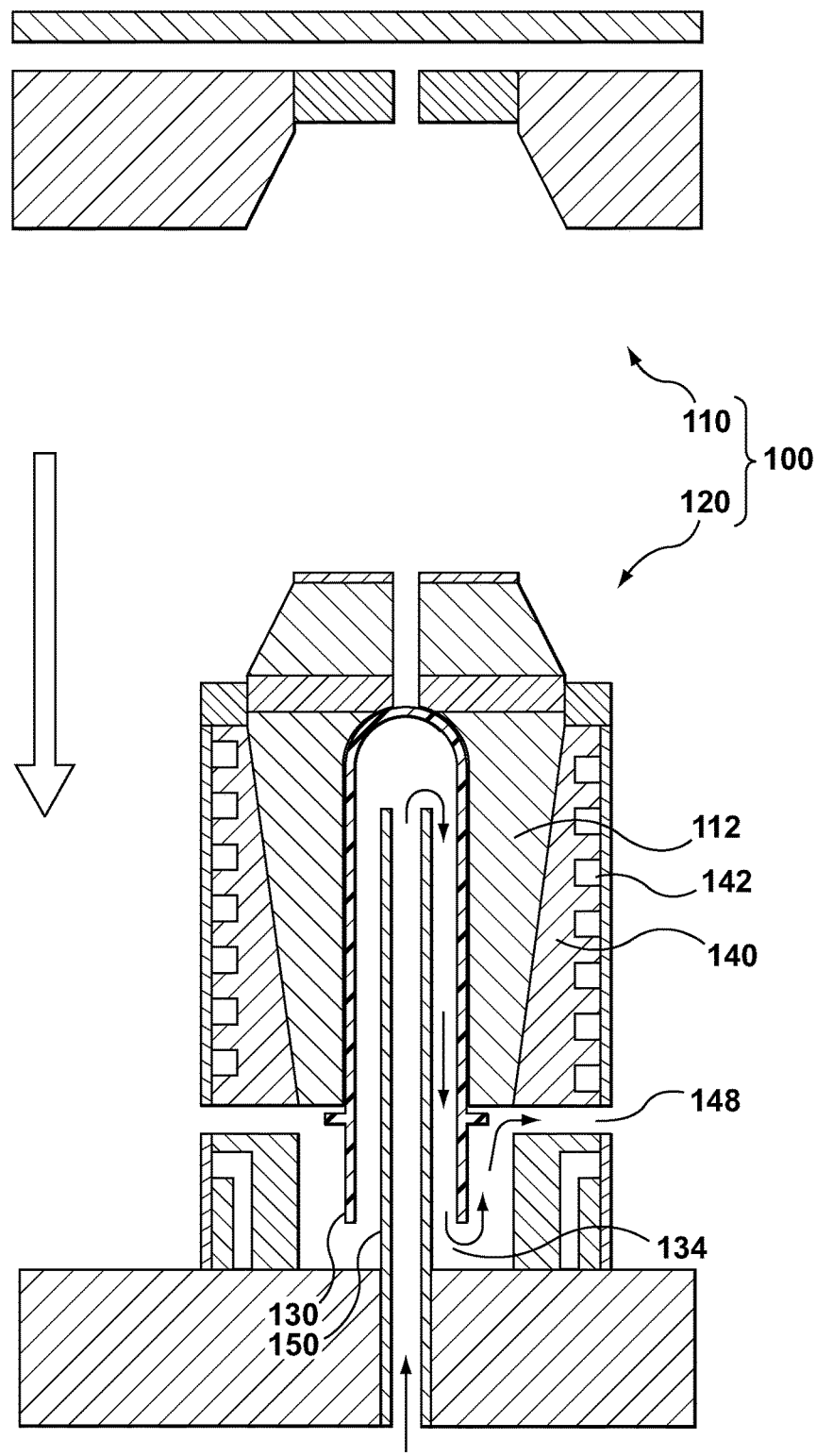

In the next step, as may be appreciated with reference to FIG. 26: i) the conditioning device 120 is moved back to its coupling position relative to the retrieval device 110; ii) conditioning of the molded article is commenced from within, wherein a flow of a conditioning fluid is established through a channel 134 that is defined between the pin 150 and the interior of the molded article 130 (i.e. convective conditioning) and through a flow channel 148 that is defined through the tubular body of the first thermal regulator 140 (i.e. the flow channel 148 is configured to fluidly communicate with the channel 134); and iii) conditioning of the exterior of the molded article 130 continues via heat flow between the receptacle 112 and the first thermal regulator 140.

An important additional benefit is that even though the receptacle 112 does not include active means of cooling or heating the molded article in this embodiment, it will retain its thermal state of for a period of time after being separated from the conditioning device due to the heat capacity of the material and therefore will begin to provide conditioning to the molded articles as soon as they are ejected from the mold into the receptacles located on the retrieval device 110. It is possible to purposely increase the heat capacity of the receptacles by utilizing one or a combination of high heat capacity materials and fluids in the design of the receptacle.

Figure 27:
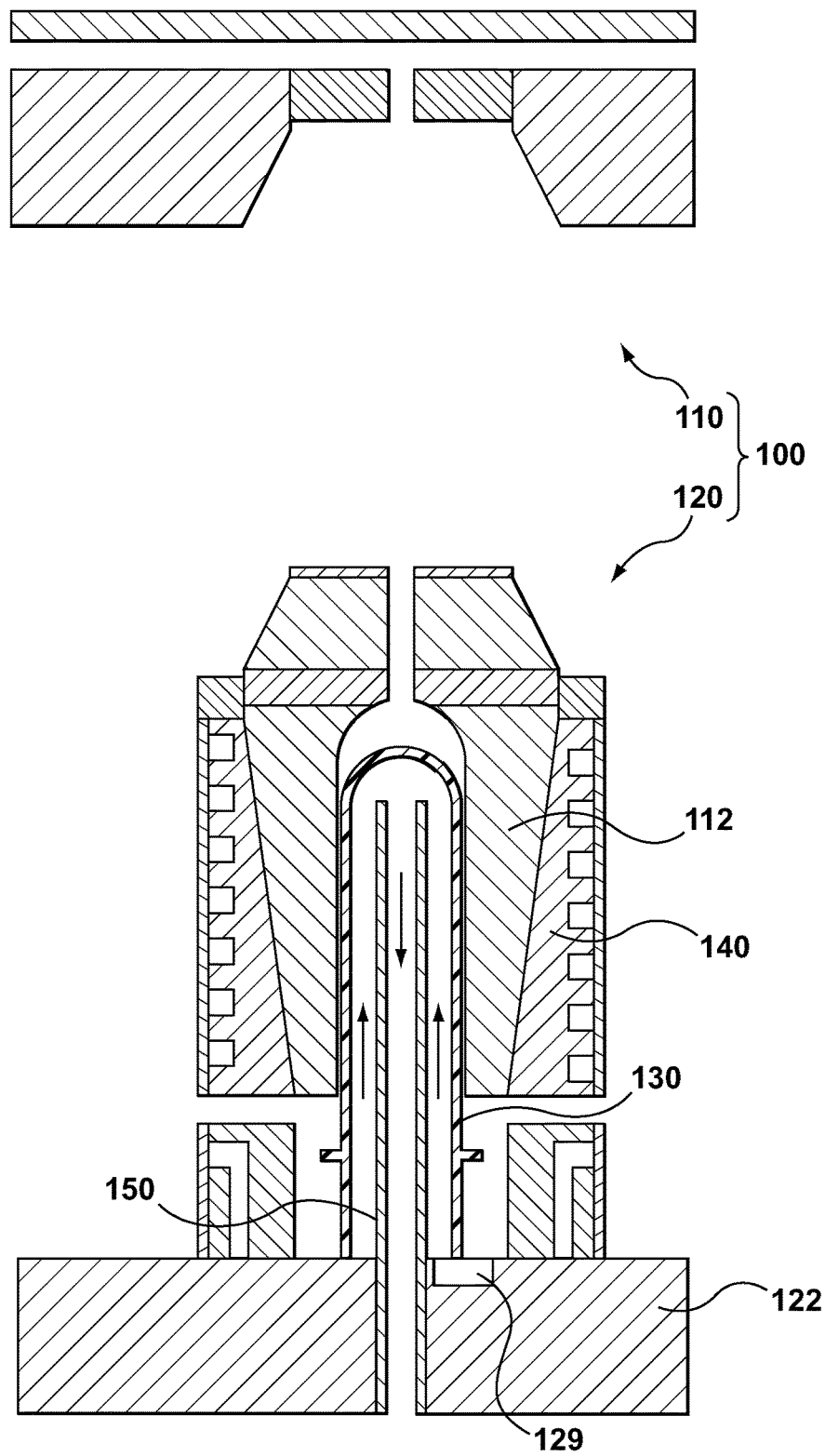

In the last step, as may be appreciated with reference to FIG. 27, once the molded article 130 has been sufficiently conditioned in receptacle 112 it is transferred to the conditioning device 120 with the application of negative pressure (i.e. less than ambient pressure) via the pin 150. Thereafter, the receptacle 112 may be transferred back to the first carrier 111 of the retrieval device 110 and the method may repeat.

Figure 28:
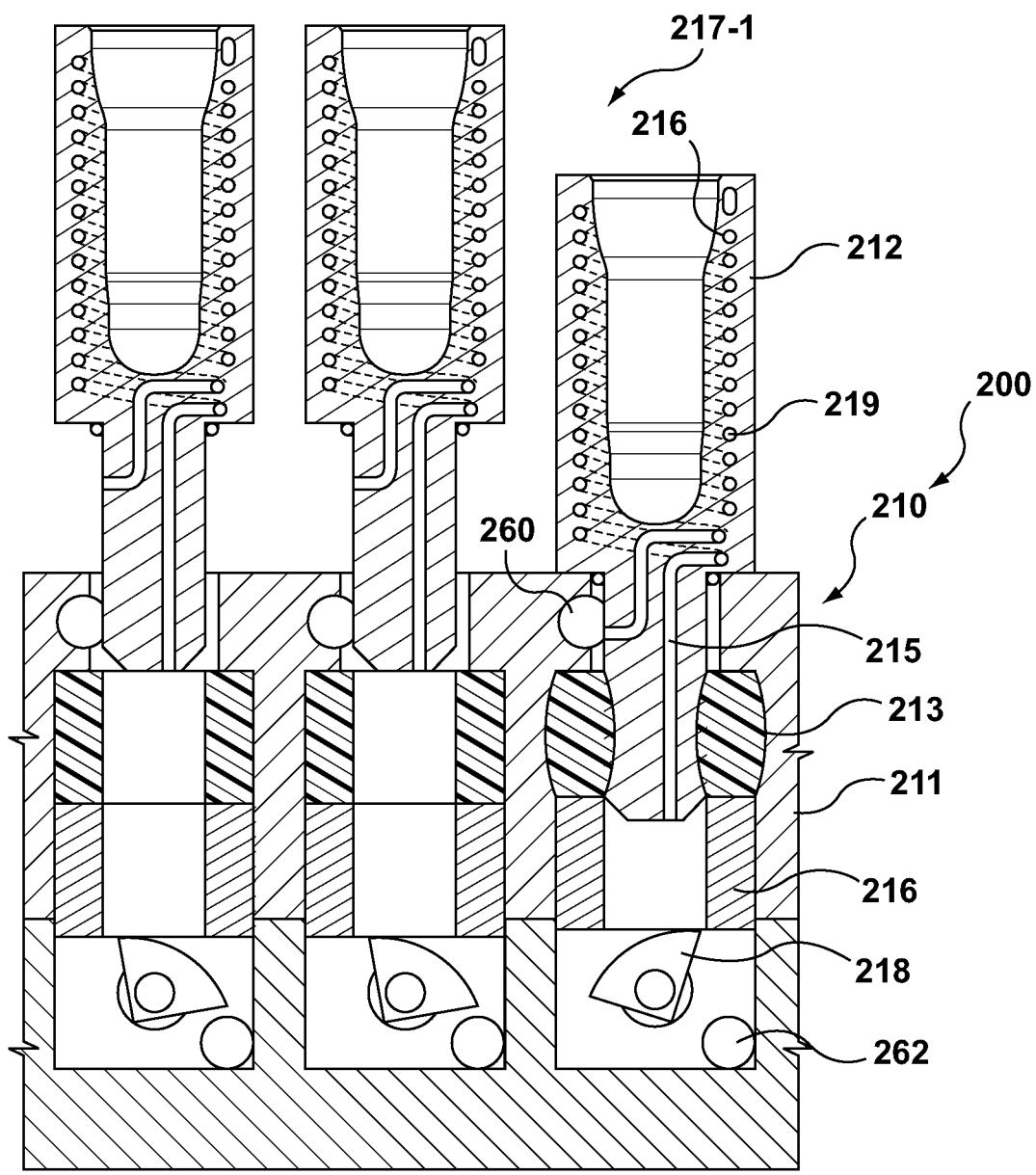
FIG. 28 depicts a section view through a retrieval device of a post-mold system in accordance with a second non-limiting embodiment of the present invention.

Reference will now be made to FIG. 28 that depicts a section view through a retrieval device 210 of a post-mold system 200 in accordance with a second non-limiting embodiment of the present invention.

The retrieval device 210 includes a first carrier 211 that is configured to be coupled to the movement structure 119 (FIG. 1) for moving a set of receptacles that are selectively couplable thereto between the inboard position and the outboard position relative to the mold 132 (FIG. 1).

The first carrier 211 of the retrieval device 210 has a set of first couplers with which to selectively couple a selected set of receptacles 217-1 thereto. A first coupler 213 of the set of first couplers is shown with which to selectively couple the receptacle 212 of the selected set to the first carrier 211. The first coupler 213 is a compression ring, and wherein the receptacle 212 includes a spigot 215 that is configured to selectively couple therewith. That is, the compression ring is radially deformable with the axial compression thereof for gripping an outer surface of the spigot 215 that is arranged therein. Axial compression of the compression ring may be provided by means of an actuator that is disposed in the first carrier 211, the actuator having an axially displaceable piston 217 that is selectively extensible with rotation of a cam 218 mechanism.

Also of note is the structure of the each of the receptacles 212. The basic structure of the receptacle 212 is one of a tubular body. The tubular body defines a cavity 216 within which to receive the molded article (not shown). The tubular body also defines a circulation channel 219 in a sidewall thereof that is connectable to a second thermal regulator 260 that is defined in the first carrier 211. The second thermal regulator 260 provides a source of conditioning fluid (e.g. air). The first carrier 211 may also define a sink 262 (e.g. vent) for the conditioning fluid that is connectable to the circulation channel 219 through a connecting channel that is defined through the piston 217. In operation, with the receptacle 212 being selectively coupled to the first carrier 211, the second thermal regulator 260 is operable to condition (e.g. cool) the receptacle 212 for conditioning of the molded article (not shown) that is receivable therein.

Figure 29:
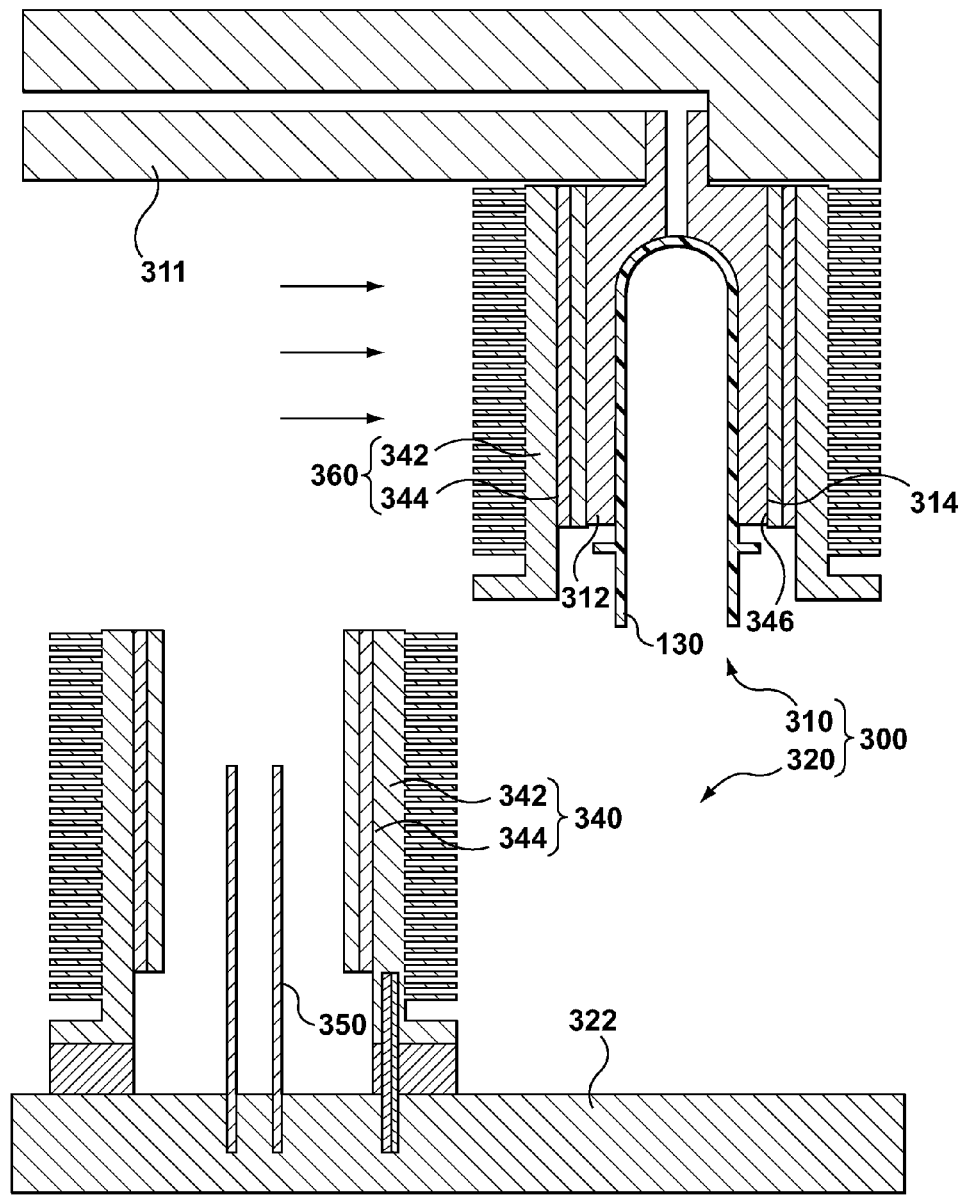
FIG. 29 depicts a section view through a post-mold system in accordance with a third non-limiting embodiment of the present invention.

Reference will now be made to FIG. 29 that depicts a section view through a post-mold system 300 in accordance with a third non-limiting embodiment of the present invention. Like the preceding non-limiting embodiments, the post-mold system 300 broadly includes a retrieval device 310 and a conditioning device 320.

The retrieval device 310 has a first carrier 311 that is configured to be coupled to the movement structure 119 (FIG. 1) for moving a selected set of receptacles that are selectively couplable thereto between the inboard position and the outboard position relative to the mold 132 (FIG. 1).

The conditioning device 320 has a second carrier 322 that is configured to be coupled to the movement structure 121 (FIG. 1) for moving the selected set of receptacles that are selectively transferable thereto (not shown) between the clearance position and the coupling position relative to the retrieval device 310.

Of note, in this non-limiting embodiment the post-mold system 300 has thermal regulators on both the retrieval device 310 and on the conditioning device 320 for conditioning of the receptacle 312 when connected thereto. That is, the conditioning device 320 includes a first thermal regulator 340 and the retrieval device 310 includes a set of a second thermal regulator 360. The construction of the first thermal regulator 340 and the second thermal regulator 360 is the same, each has a tubular body 342 made from a thermally conductive material having radial fins defined on the outer surface thereof for sake of providing heat transfer with air flowing therearound. Disposed within the tubular body 342 is a thermoelectric device 344. The thermoelectric device defines a first seat 346 (i.e. cylindrical) within which to receive a first mating interface 414 that is defined on the receptacle 412. In operation, the thermoelectric devices 446 are operable to thermally regulate the molded article 130 by pumping heat in a desired direction between the receptacle 312 and the tubular body 342.

Figure 30:
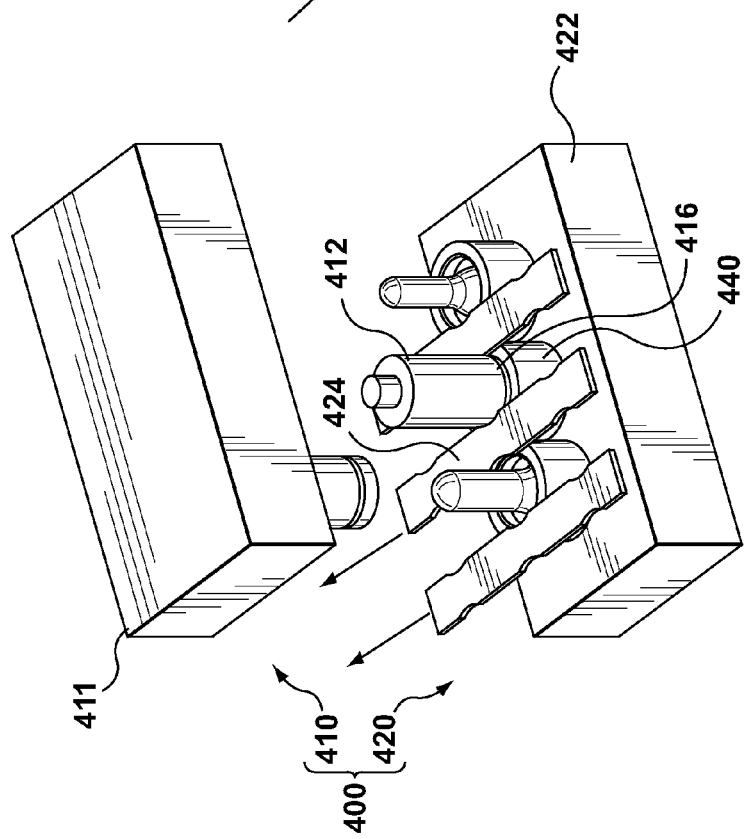

Reference will now be made to FIG. 30 that depicts a perspective view through a post-mold system 400 in accordance with a fourth non-limiting embodiment of the present invention. Like the preceding non-limiting embodiments, the post-mold system 400 broadly includes a retrieval device 410 and a conditioning device 420.

The retrieval device 410 has a first carrier 411 that is configured to be coupled to the movement structure 119 (FIG. 1) for moving a selected set of receptacles that are selectively couplable thereto between the inboard position and the outboard position relative to the mold 132 (FIG. 1).

The conditioning device 420 has a second carrier 422 that is configured to be coupled to the movement structure 121 (FIG. 1) for moving the selected set of receptacles that are selectively transferable thereto (not shown) between the clearance position and the coupling position relative to the retrieval device 410.

Figure 31:
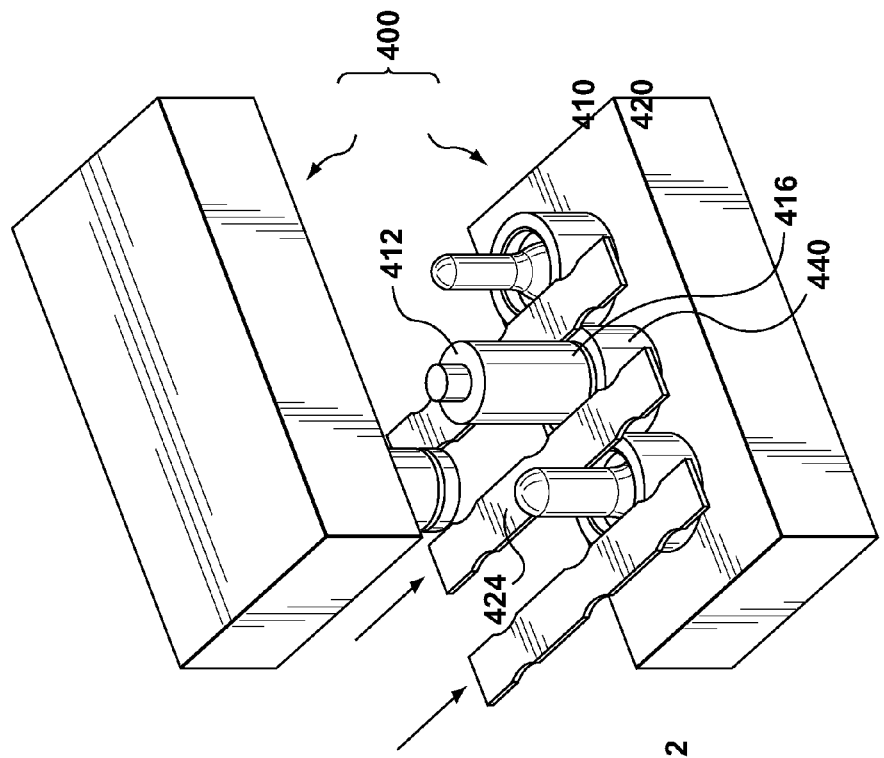
FIGS. 30 and 31 depict perspective views of a post-mold system in accordance with a fourth non-limiting embodiment of the present invention.

Of note, in this non-limiting embodiment the conditioning device 420 includes a second coupler 424 in the form of a pair of slide locks, and wherein the receptacle 412 includes a groove interface 416 that is configured to selectively couple therewith. In operation, the pair of slide locks is slidable in the direction shown in FIG. 31 to engage the groove interface 416 and thereby couple the receptacle 412 to the second carrier 422.

Figure 32:
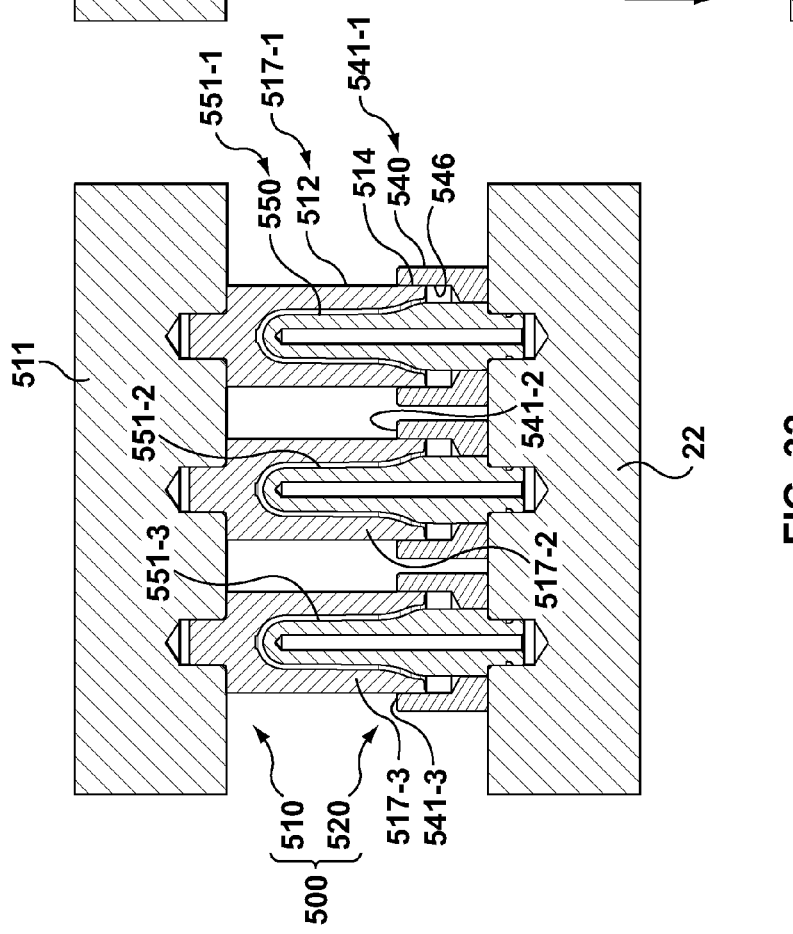

Reference will now be made to FIG. 32 that depicts a section view through a post-mold system 500 in accordance with a fifth non-limiting embodiment of the present invention. Like the preceding non-limiting embodiments, the post-mold system 500 broadly includes a retrieval device 510 and a conditioning device 520.

The retrieval device 510 has a first carrier 511 that is configured to be coupled to the movement structure 119 (FIG. 1) for moving selected ones of a first set of receptacles 517-1, a second set of receptacles 517-2 and a third set of receptacles 517-3 between the inboard position and the outboard position relative to the mold 132 (FIG. 1).

The conditioning device 520 has a second carrier 522 that is configured to be coupled to another movement structure (not shown) for moving selected ones of the first set of receptacles 517-1, the second set of receptacles 517-2 and the third set of receptacles 517-3 between a clearance position and a coupling position relative to the retrieval device 510. The conditioning device 520 also has a first set of thermal regulators 540-1, a second set of thermal regulators 540-2 and a third set of thermal regulators 540-3 for thermally regulating the selected ones of the first set of receptacles 517-1, the second set of receptacles 517-2 and the third set of receptacles 517-3, respectively, when connected thereto. The conditioning device 520 also has a first set of pins 551-1, a second set of pins 551-2 and a third set of pins 551-3 for conditioning interiors of a first group of molded articles (not shown), a second group of molded articles (not shown) and a third group of molded articles (not shown), respectively.

Of note, each first thermal regulator 540 of each of the sets of first thermal regulators is integrally formed with a pin 550 of one of the sets of pins. It may be further noted that each pin 550 defines a circulation channel therein within which to circulate a conditioning fluid. Furthermore, it may be noted that the first thermal regulator 540 has a tubular body that defines a first seat 546 within which to receive a first mating interface 514 that is defined on a receptacle 512 of the sets of receptacles.

Also of note, in this non-limiting embodiment the receptacles and pins are both contoured to provide an intimate fit with the interior of the molded article 130. As such, it may be said that the receptacles and the pins are both configured to provide conductive conditioning to the molded article 130.

The operation of the post-mold-system 500 will now be briefly discussed. In FIG. 32, it may be appreciated, amongst other things, that: i) the retrieval device 510 is in its outboard position; and ii) the conditioning device 520 is in its coupling position with first set of receptacles being coupled to both the retrieval device 510 and to the conditioning device 520. In addition it may be noted that the first set of receptacles 517-1, the second set of receptacles 517-2 and the third set of receptacles 517-3 are all empty.

Figure 33:
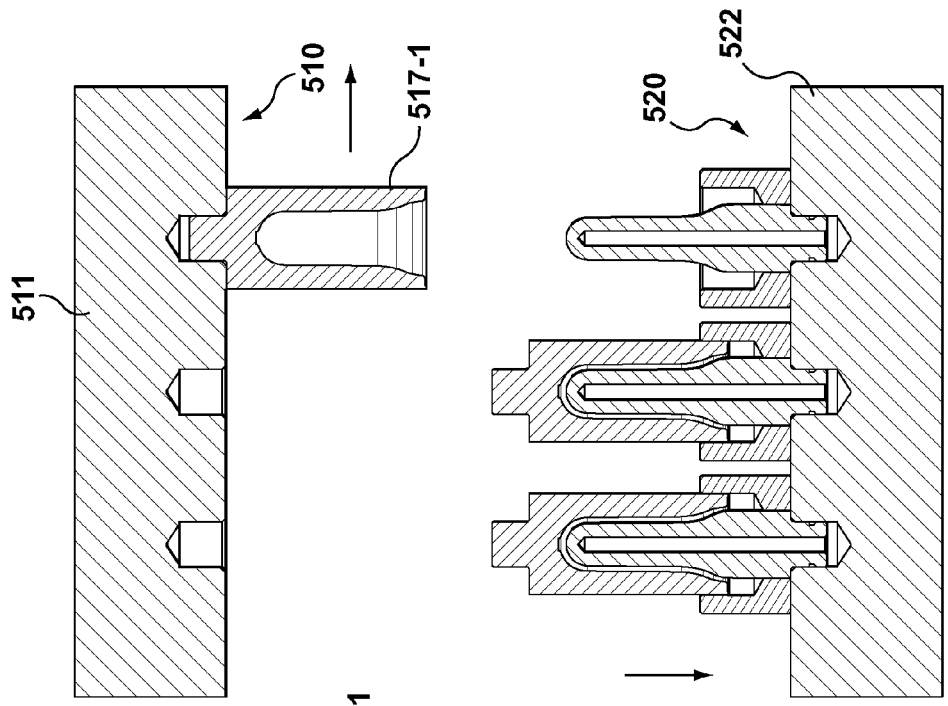
FIGS. 32-41 depict an operating sequence of the post-mold system in accordance with a fifth non-limiting embodiment of the present invention.

In the next step, as may be appreciated with reference to FIG. 33: i) the first set of receptacles 517-1 have been transferred to the first carrier 511 and the retrieval device 510 is about to be moved to the inboard position to retrieve a first group of molded articles (not shown) from the mold (not shown) therewith; ii) the second set of receptacles 517-2 and the third set of receptacles 517-3 have been transferred to the second carrier 522; and iii) the conditioning device 520 has been moved to its clearance position.

Figure 34:
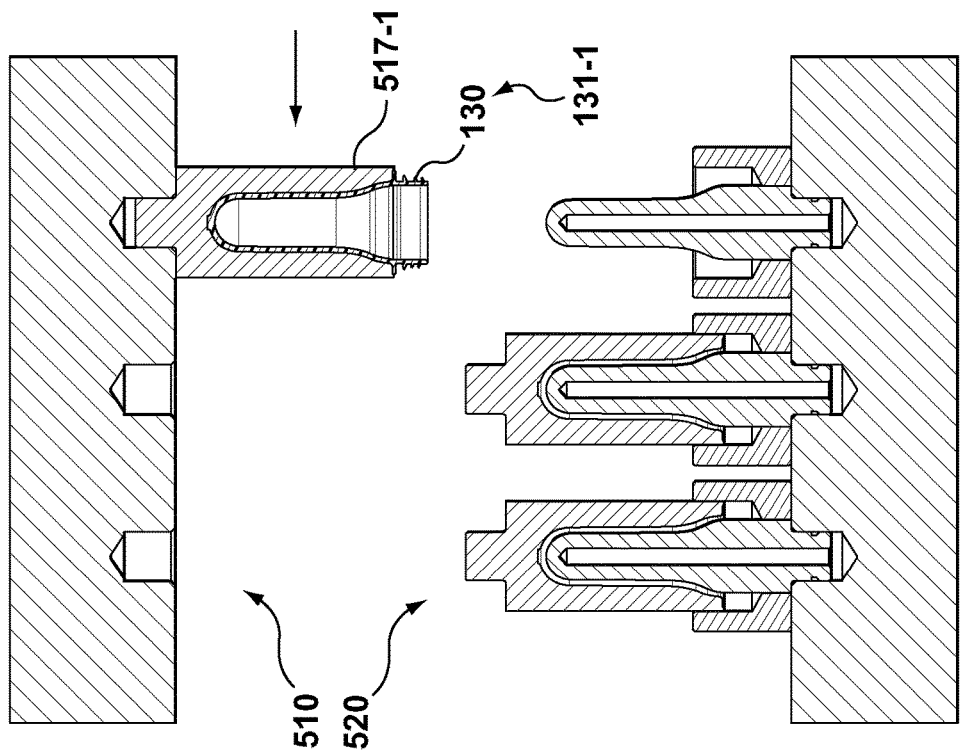

In the next step, as may be appreciated with reference to FIG. 34, the retrieval device 510 has returned to the outboard position holding a first group of molded articles 517-1 within the first set of receptacles 517-1.

Figure 35:
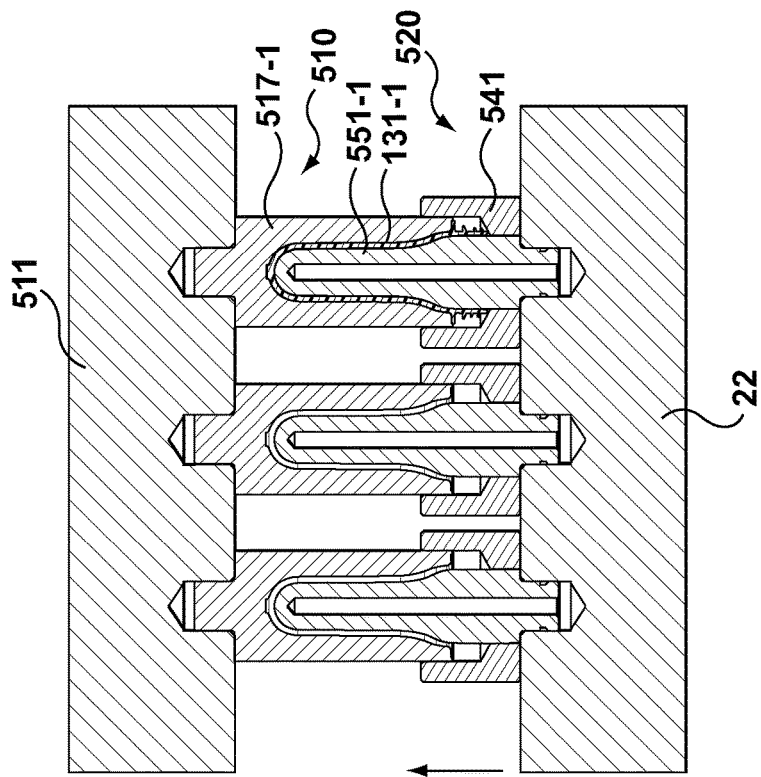

In the next step, as may be appreciated with reference to FIG. 35: i) the conditioning device 520 has been moved back to its coupling position and in so doing has engaged the first set of pins 551-1 with the first group of molded articles 131-1; and ii) the first set of receptacles 517-1 along with the first group of molded articles 131-1 therein have been transferred to the conditioning device 520.

Figure 36:
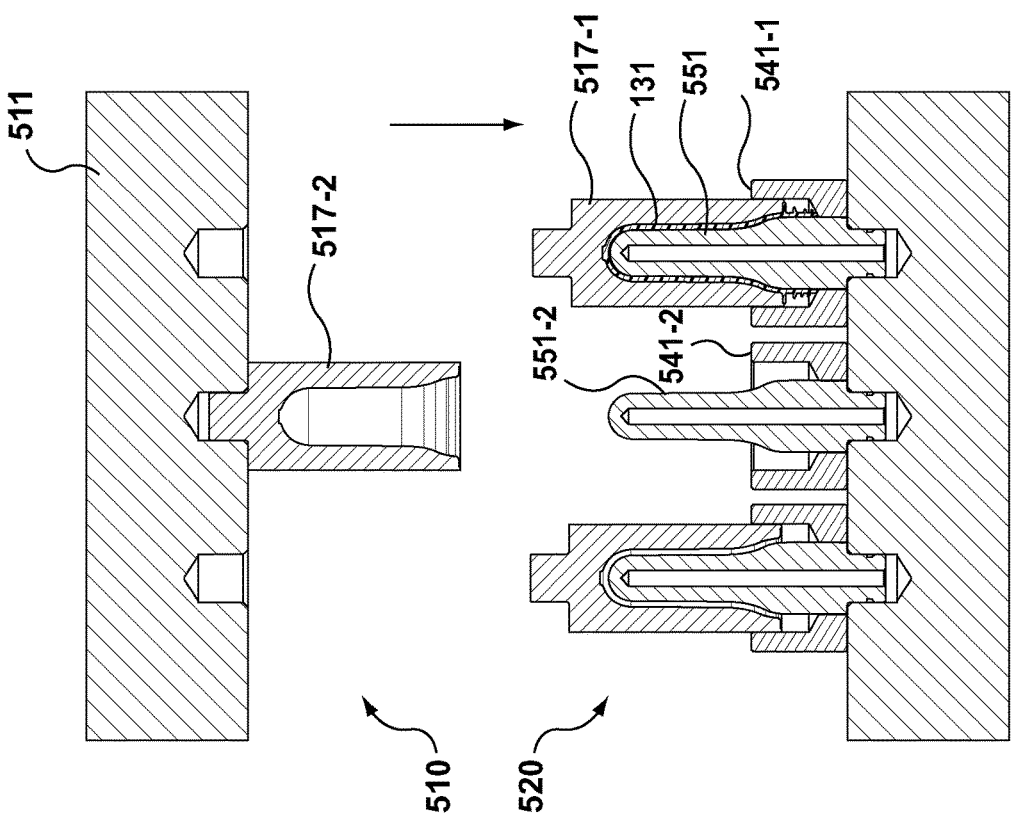

In the next step, as may be appreciated with reference to FIG. 36: i) the second set of receptacles 517-2 have been transferred to the first carrier 511 and the retrieval device 510 is about to be moved to the inboard position to retrieve a second group of molded articles (not shown) from the mold (not shown) therewith; ii) the first set of receptacles 517-1 and the third set of receptacles 517-3 remain coupled to the second carrier 522; and iii) the conditioning device 520 has been moved to its clearance position.

Figure 37:
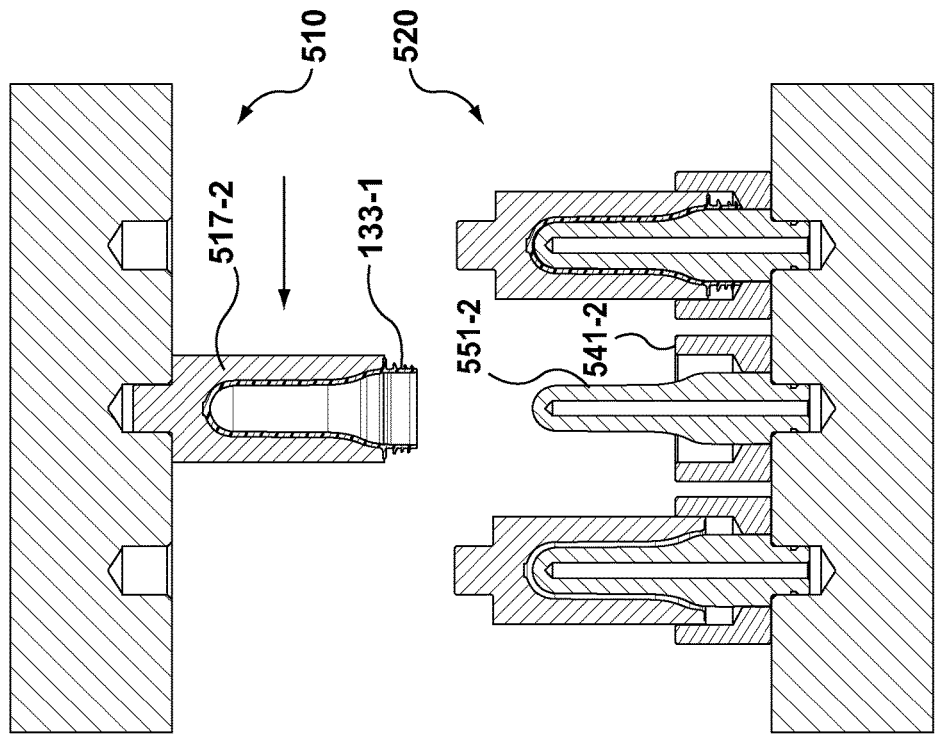

In the next step, as may be appreciated with reference to FIG. 37, the retrieval device 510 has returned to the outboard position holding a second group of molded articles 517-2 within the second set of receptacles 517-2.

Figure 38:
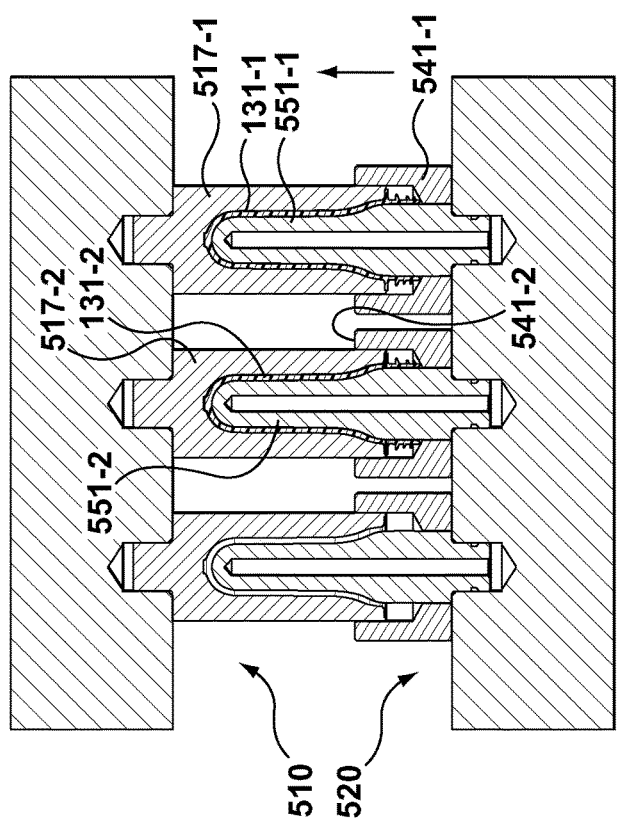

In the next step, as may be appreciated with reference to FIG. 38: i) the conditioning device 520 has been moved back to its coupling position and in so doing has engaged the second set of pins 551-2 with the second group of molded articles 131-2; and ii) the second set of receptacles 517-2 along with the second group of molded articles 131-2 therein have been transferred to the conditioning device 520.

Figure 39:
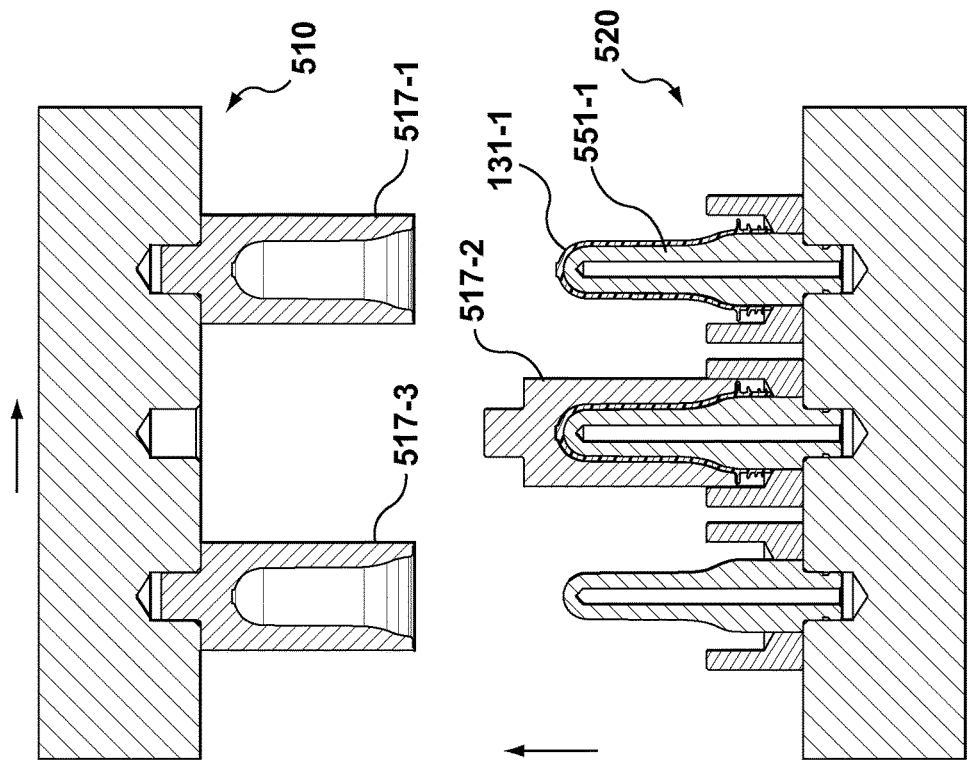

In the next step, as may be appreciated with reference to FIG. 39: i) the third set of receptacles 517-3 have been transferred to the first carrier 511 and the retrieval device 510 is about to be moved to the inboard position to retrieve a third group of molded articles (not shown) from the mold (not shown) therewith; ii) the first set of receptacles 517-1 have been transferred to the first carrier 511 leaving the first group of molded article 131-1 behind on the first set of pins 551-1; iii) the second set of receptacles 517-2 remain coupled to the second carrier 522; and iv) the conditioning device 520 has been moved to its clearance position.

Figure 40:
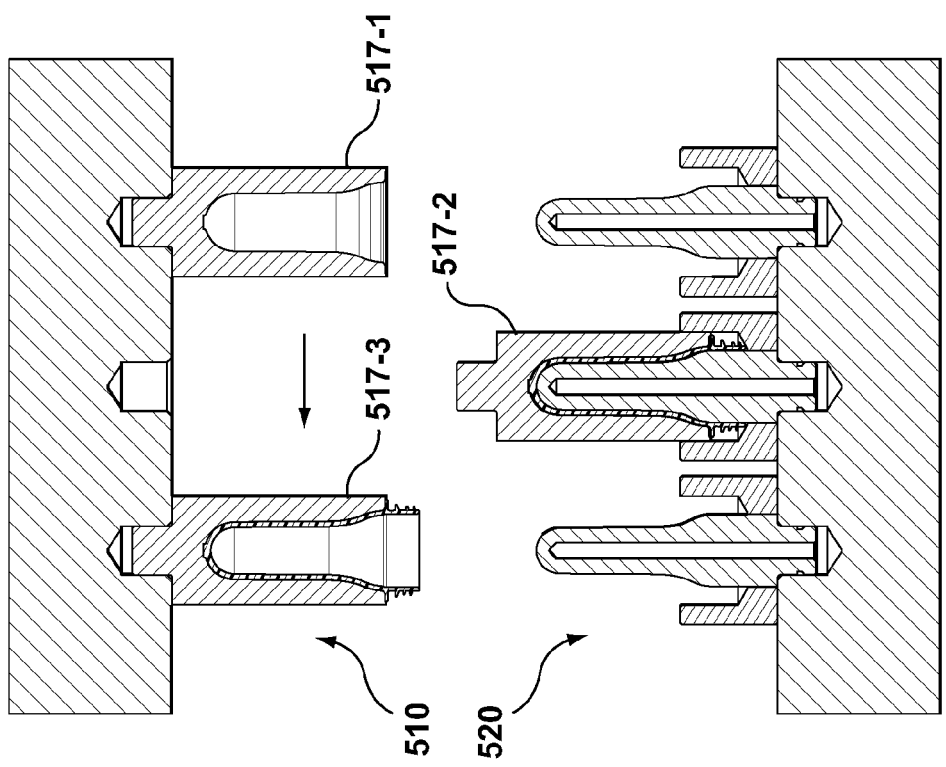

In the next step, as may be appreciated with reference to FIG. 40: i) the retrieval device 510 has returned to the outboard position holding a third group of molded articles 517-3 within the third set of receptacles 517-2; ii) the first set of receptacles 517-1 have returned to the outboard position; and iii) the first group of molded article (not shown) have been ejected from the first set of pins 551-1.

Figure 41:
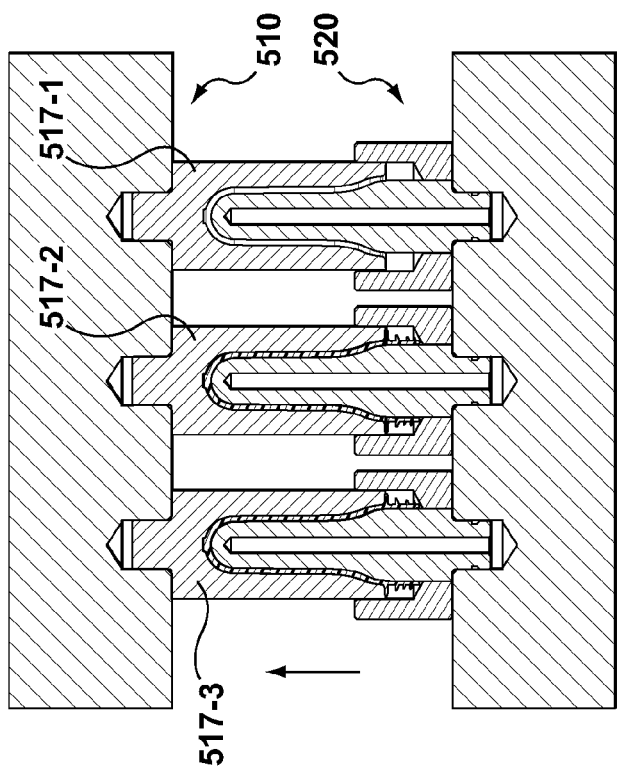

In the next step, as may be appreciated with reference to FIG. 41: i) the conditioning device 520 has been moved back to its coupling position and in so doing has engaged the third set of pins 551-3 with the third group of molded articles 131-3; and ii) the third set of receptacles 517-3 along with the third group of molded articles 131-3 therein have been transferred to the conditioning device 520.

At this point the method may repeat.

Figure 42:
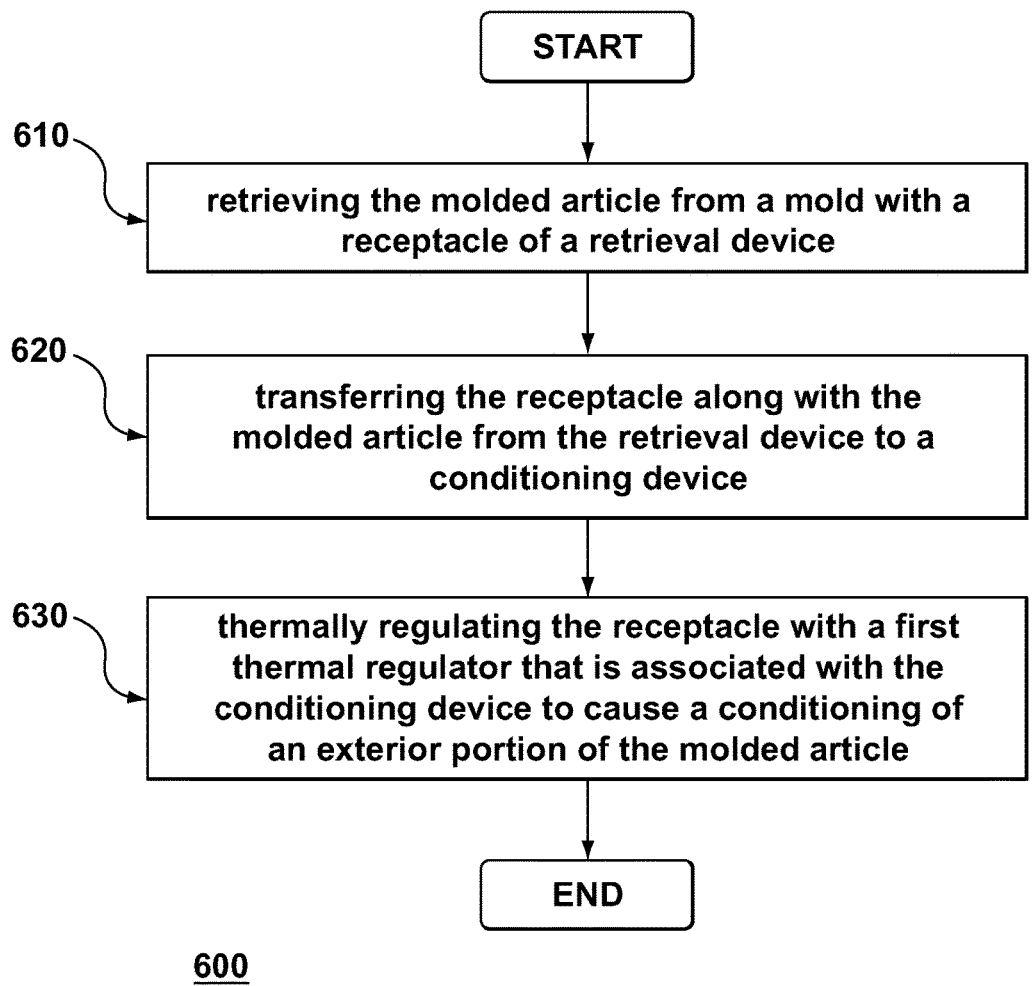
FIG. 42 depicts a flow chart of a method of post-mold conditioning of a molded article.

The foregoing methods of operating the post-mold-systems 100, 200, 300, 400, and 500 may be summarized in accordance with the flow chart depicted with reference to FIG. 42.

In particular, the method of post-mold conditioning 600 includes the steps of:

Step 610:

The method 600 begins with retrieving the molded article 130 from a mold 132 with a receptacle 112, 212, 312, 412, 512 of the retrieval device 110, 210, 310, 410, 510. More specifically, the step may involve i) moving the conditioning device 120, 320, 420, 520 relative to the retrieval device 110 into the coupling position; ii) decoupling the receptacle 112, 220, 320, 420, 512 from the retrieval device 110, 210, 310, 410, 510 with operation of the first coupler 113, 213 that is associated therewith; and iii) coupling the receptacle 112, 212, 312, 412, 512 to the conditioning device 120, 220, 320, 420, 520 with the operation of the second coupler 124, 424 that is associated therewith. The step of moving the conditioning device 120 relative the retrieval device 110 into the coupling position may provide for positioning of the pin 150, 550 of the conditioning device 120, 520 within an interior of the molded article 130 for performing a step of conditioning the interior of the molded article 130.

This step may be performed as part of a step of retrieving a first group of molded articles 131-1 from the mold 132 with a first set of receptacles 117-1, 517-1;

Step 620:

Next, the method 600 includes transferring the receptacle 112, 212, 312, 412, 512 along with the molded article 130 from the retrieval device 110, 210, 310, 410 to the conditioning device 120, 320, 420, 520.

This step may be performed as a part of a step of transferring the first set of receptacles 117-1, 517-1 along with the first group of molded articles 131-1 from the retrieval device 110, 510 to the conditioning device 120, 520;

Step 630:

The method 600 then ends, or is repeated, after a step of thermally regulating the receptacle 112, 212, 312, 412, 512 with the first thermal regulator 140, 240, 440 that is associated with the conditioning device 120, 320, 420, 520 to cause the conditioning of an exterior portion of the molded article 130.

This step may be performed as part of a step of thermally regulating the first set of receptacles 117-1, 517-1 with a first set of thermal regulators 141-1, 541-1 that are associated with the conditioning device 120, 520 to cause a conditioning of the exterior of the first group of molded articles 131-1.

The method 600 may also include i) transferring a second set of receptacles 117-2, 517-2 from the conditioning device 120, 520 to the retrieval device 110, 510; ii) retrieving a second group of molded articles 131-2 from the mold 132 with the second set of receptacles 117-2, 517-2; iii) transferring the second set of receptacles 117-2, 517-2 along with the second group of molded articles 131-2 from the retrieval device 110, 510 to the conditioning device 120, 520; and iv) thermally regulating the second set of receptacles 117-2, 517-2 with a second set of thermal regulators 141-2, 541-2 that are associated with the conditioning device 120, 520 to cause a conditioning of the exterior of the second group of molded articles 131-2.

The step of transferring of the second set of receptacles 517-2 along with the second group of molded articles 131-2 from the retrieval device 510 to the conditioning device 520 may provide for positioning of a second set of pins 550-2 of the conditioning device 520 within interiors of the second group of molded articles for conditioning the interiors of the second group of molded articles 131-2.

The step of transferring of the second set of receptacles 117-2 from the conditioning device 120 to the retrieval device 110 may include: i) moving the conditioning device 120 relative the retrieval device 110 to a clearance position; ii) rotating the conditioning device 120 to present the second set of receptacles 117-2 to the retrieval device 110; iii) moving the conditioning device 120 relative the retrieval device 110 to the coupling position; iv) decoupling the second set of receptacles 117-2 from the conditioning device 120; v) coupling the second set of receptacles 117-2 to the retrieval device 110; vi) ejecting a previously molded group of molded articles 131-$p$ from the second set of receptacles 117-2; and vii) capturing the previously molded group of molded articles 131-$p$ with the conditioning device 120. For sake of ejecting the previously molded group of molded articles 131-$p$, the method 600 may further include: viii) moving the conditioning device 120 relative the retrieval device 110 to the clearance position; ix) rotating the conditioning device 120 to orient the previously molded group of molded articles 131-$p$ for ejection therefrom; and x) ejecting the previously molded group of molded articles 131-$p$ from the conditioning device 120.

The foregoing method 600 is executable by a controller (not shown) of the post-mold system 100, 200, 300, 400, 500. The controller can be implemented as a general-purpose or purpose-specific computing apparatus. The controller includes memory configured to store one or more instructions for executing one or more routines for performing the method of post-mold conditioning 600 in accordance with the flow chart.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying the invention in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A post-mold system for conditioning a molded article, comprising:
    a retrieval device having a receptacle that is configured to retrieve the molded article from a mold; and
    a conditioning device;
    the receptacle is configured to be selectively transferable between the retrieval device and the conditioning device;
    wherein the conditioning device includes a first thermal regulator that is configured to thermally regulate the receptacle when connected thereto;
    the retrieval device and the conditioning device are configured to be movable relative to each other between a clearance position and a coupling position;
    the retrieval device includes a first carrier, and wherein the first carrier is configured to be movable between an inboard position and an outboard position relative to the mold within which the molded article is moldable;
    the first carrier includes a first coupler that is configured to selectively couple the receptacle thereto;
    the conditioning device includes a second carrier, and wherein the second carrier is configured to be movable between the clearance position and the coupling position relative to the retrieval device;
    the second carrier includes a second coupler that is configured to selectively couple the receptacle thereto.

2. The post-mold system of claim 1, wherein:
    the receptacle is configured to provide at least one of: convective or conductive conditioning to the molded article.

3. The post-mold system of claim 1, wherein:
    the conditioning device has a pin that is configured to condition an interior of the molded article.

4. The post-mold system of claim 3, wherein:
    the pin is configured to provide one of: convective or conductive conditioning to the molded article.

5. The post-mold system of claim 4, wherein:
    the pin is a tube that is configured to be connected to a source or sink of air for establishing a circulation of air within the interior of the molded article.

6. The post-mold system of claim 4, wherein:
    the pin is a contoured to provide an intimate fit with the interior of the molded article, and wherein the pin defines a circulation channel therein within which to circulate a conditioning fluid.

7. The post-mold system of claim 3, wherein:
    the first thermal regulator has a tubular body that defines a first seat within which to receive a first mating interface that is defined on the receptacle.

8. The post-mold system of claim 7, wherein:
    the first seat and the first mating interface of the receptacle are tapered.

9. The post-mold system of claim 7, wherein:
    the tubular body defines a circulation channel within which to circulate a conditioning fluid.

10. The post-mold system of claim 7, wherein:
    the tubular body has a thermoelectric device associated therewith that is configured to condition the receptacle.

11. The post-mold system of claim 3, wherein: the first coupler is an electro-magnet, and wherein the receptacle includes a first ferromagnetic interface that is configured to selectively couple therewith.

12. The post-mold system of claim 3, wherein: the first coupler is a compression ring, and wherein the receptacle includes a spigot that is configured to selectively couple therewith.

13. The post-mold system of claim 3, wherein: wherein the retrieval device includes a second thermal regulator that is configured to thermally regulate the receptacle when connected thereto.

14. The post-mold system of claim 3, wherein: the second coupler is an electro-magnet, and wherein the receptacle includes a second ferromagnetic interface that is configured to selectively couple therewith.

15. The post-mold system of claim 3, wherein: the second coupler is a pair of slide locks, and wherein the receptacle includes a groove interface that is configured to selectively couple therewith.

* * * * *